(12) United States Patent
Horn et al.

(10) Patent No.: US 11,917,675 B2
(45) Date of Patent: Feb. 27, 2024

(54) TECHNIQUES FOR CHANNEL AWARE RANK ADAPTATION

(71) Applicant: QUALCOMM Incorporated, San Diego, CA (US)

(72) Inventors: Idan Michael Horn, Hod Hasharon (IL); Shay Landis, Hod Hasharon (IL); Amit Bar-Or Tillinger, Tel-Aviv (IL)

(73) Assignee: QUALCOMM Incorporated, San Diego, CA (US)

( * ) Notice: Subject to any disclaimer, the term of this patent is extended or adjusted under 35 U.S.C. 154(b) by 214 days.

(21) Appl. No.: 17/484,111

(22) Filed: Sep. 24, 2021

(65) Prior Publication Data

US 2023/0097779 A1    Mar. 30, 2023

(51) Int. Cl.
*H04W 72/563* (2023.01)
*H04W 72/0453* (2023.01)

(52) U.S. Cl.
CPC ..... *H04W 72/563* (2023.01); *H04W 72/0453* (2013.01)

(58) Field of Classification Search
CPC .. H04W 72/563; H04W 72/0453; H04B 7/02; H04L 5/00
See application file for complete search history.

(56) References Cited

U.S. PATENT DOCUMENTS

| | | | |
|---|---|---|---|
| 2018/0027527 A1* | 1/2018 | Vitthaladevuni | H04W 72/0453 370/330 |
| 2018/0270814 A1* | 9/2018 | John Wilson | H04L 1/0029 |
| 2018/0337716 A1* | 11/2018 | Fakoorian | H04B 7/0691 |
| 2020/0053764 A1* | 2/2020 | Kim | H04W 72/0453 |
| 2020/0077437 A1* | 3/2020 | Stern-Berkowitz | H04L 5/0051 |
| 2020/0267760 A1* | 8/2020 | Bhattad | H04L 5/008 |
| 2020/0337048 A1* | 10/2020 | Abedini | H04L 5/0044 |
| 2020/0413416 A1* | 12/2020 | Jiang | H04W 72/563 |
| 2021/0058128 A1* | 2/2021 | Raghavan | H04B 7/0686 |
| 2021/0250069 A1* | 8/2021 | Yu | H04B 7/0632 |
| 2021/0385666 A1* | 12/2021 | Ramiro Moreno | H04W 16/18 |
| 2022/0400471 A1* | 12/2022 | Hu | H04B 7/0634 |
| 2022/0417965 A1* | 12/2022 | Wang | H04L 5/005 |
| 2023/0084460 A1* | 3/2023 | Gao | H04L 5/0094 |
| 2023/0141172 A1* | 5/2023 | Zhang | H04B 7/0486 370/329 |

* cited by examiner

*Primary Examiner* — Yu-Wen Chang
(74) *Attorney, Agent, or Firm* — Holland & Hart LLP

(57) ABSTRACT

Methods, systems, and devices for wireless communications are described. A base station and a user equipment (UE) may perform dynamic rank assignment in multiple-input multiple-output (MIMO) communications by leveraging channel reciprocity. For example, the base station and the UE may apply a common algorithm to enable dynamic rank assignment of allocated frequency resources within a communication slot. In some examples, at least one threshold may be utilized to assign different ranks to different frequency resources. Additionally or alternatively, a number of frequency resources assigned a lower rank may be indicated between the base station and the UE in accordance with a joint criteria. Further, dynamic rank assignment may allow the base station and the UE to account for channel fading, improving throughput over the channel without increasing signaling overhead.

30 Claims, 15 Drawing Sheets

TECHNIQUES FOR CHANNEL AWARE RANK ADAPTATION

FIELD OF TECHNOLOGY

The following relates to wireless communications, including techniques for channel aware rank adaptation.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

A UE may communicate with a base station using multiple ranks in multiple-input multiple-output (MIMO) operations. However, in some cases, existing MIMO techniques may be deficient.

SUMMARY

The described techniques relate to improved methods, systems, devices, and apparatuses that support techniques for channel aware rank adaptation. Generally, the described techniques provide for wireless communications systems to perform channel aware dynamic ranking over a number of allocated subcarriers. Generally, the described techniques provide for dynamic determination of ranks for multiple frequency (e.g., as in multiple-input multiple-output (MIMO) operations) where ranks may be assigned to individual frequency resources according to one or more techniques described herein. in some examples, individual subcarriers may be assigned ranks without additional signaling overhead between two or more wireless devices, such as a base station and a user equipment (UE). In such cases, the UE and the base station may execute a common algorithm to assign ranks to the allocated frequency resources to increase communication performance and signaling throughput. In some examples, the common algorithm may include computing a capacity for subcarriers within the allocated frequency resources. Additionally or alternatively, the common algorithm may include decomposing allocated frequency resources such that associated eigenvalues are calculated and utilized to apply dynamic channel rank assignment. In some cases, a wireless device may utilize machine learning algorithms to apply dynamic channel rank assignment.

A method for wireless communications at a user equipment (UE) is described. The method may include transmitting, to a base station, one or more reference signals, receiving control signaling indicating a rank adaptation parameter for communications with the base station, where the rank adaptation parameter is based on the one or more reference signals, determining, based on receiving the rank adaptation parameter, a first rank for communicating with the base station in a first set of frequency resources and a second rank for communicating with the base station in a second set of frequency resources, the second rank being lower than the first rank, and communicating with the base station in the first set of frequency resources according to the first rank and in the second set of frequency resources according to the second rank.

An apparatus for wireless communications at a UE is described. The apparatus may include a processor, memory coupled with the processor, and instructions stored in the memory. The instructions may be executable by the processor to cause the apparatus to transmit, to a base station, one or more reference signals, receive control signaling indicating a rank adaptation parameter for communications with the base station, where the rank adaptation parameter is based on the one or more reference signals, determine, based on receiving the rank adaptation parameter, a first rank for communicating with the base station in a first set of frequency resources and a second rank for communicating with the base station in a second set of frequency resources, the second rank being lower than the first rank, and communicate with the base station in the first set of frequency resources according to the first rank and in the second set of frequency resources according to the second rank.

Another apparatus for wireless communications at a UE is described. The apparatus may include means for transmitting, to a base station, one or more reference signals, means for receiving control signaling indicating a rank adaptation parameter for communications with the base station, where the rank adaptation parameter is based on the one or more reference signals, means for determining, based on receiving the rank adaptation parameter, a first rank for communicating with the base station in a first set of frequency resources and a second rank for communicating with the base station in a second set of frequency resources, the second rank being lower than the first rank, and means for communicating with the base station in the first set of frequency resources according to the first rank and in the second set of frequency resources according to the second rank.

A non-transitory computer-readable medium storing code for wireless communications at a UE is described. The code may include instructions executable by a processor to transmit, to a base station, one or more reference signals, receive control signaling indicating a rank adaptation parameter for communications with the base station, where the rank adaptation parameter is based on the one or more reference signals, determine, based on receiving the rank adaptation parameter, a first rank for communicating with the base station in a first set of frequency resources and a second rank for communicating with the base station in a second set of frequency resources, the second rank being lower than the first rank, and communicate with the base station in the first set of frequency resources according to the first rank and in the second set of frequency resources according to the second rank.

In some examples of the method, apparatuses, and non-transitory computer-readable medium described herein, communicating with the base station may include operations, features, means, or instructions for receiving, based on the rank adaptation parameter, first downlink signaling in the first set of frequency resources according to the first rank and second downlink signaling in the second set of frequency resources according to the second rank.

Some examples of the method, apparatuses, and non-transitory computer-readable medium described herein may further include operations, features, means, or instructions for demodulating the first downlink signaling according to a first precoding parameter and demodulating the second downlink signaling according to the first precoding parameter or according to a second precoding parameter indicated in the control signaling.

In some examples of the method, apparatuses, and non-transitory computer-readable medium described herein, communicating with the base station may include operations, features, means, or instructions for transmitting, based on the rank adaptation parameter, first uplink signaling in the first set of frequency resources according to the first rank and second uplink signaling in the second set of frequency resources according to the second rank.

Some examples of the method, apparatuses, and non-transitory computer-readable medium described herein may further include operations, features, means, or instructions for encoding the first uplink signaling according to a first precoding parameter, where the first uplink signaling may be transmitted based on encoding the first uplink signaling and encoding the second uplink signaling according to the first precoding parameter or according to a second precoding parameter indicated in the control signaling, where the second uplink signaling may be transmitted based on encoding the second uplink signaling.

Some examples of the method, apparatuses, and non-transitory computer-readable medium described herein may further include operations, features, means, or instructions for identifying, based on the control signaling, a quantity of frequency resources associated with the second rank and determining, based on identifying the quantity of frequency resources, the second set of frequency resources, where communicating with the base station may be based on determining the second set of frequency resources.

In some examples of the method, apparatuses, and non-transitory computer-readable medium described herein, the rank adaptation parameter includes the quantity of frequency resources.

In some examples of the method, apparatuses, and non-transitory computer-readable medium described herein, the rank adaptation parameter indicates the quantity of frequency resources as a percentage of a frequency resource allocation for the communications with the base station.

Some examples of the method, apparatuses, and non-transitory computer-readable medium described herein may further include operations, features, means, or instructions for identifying, based on the control signaling, a threshold associated with a channel criterion of a channel for the communications with the base station and determining, based on identifying the threshold, the second set of frequency resources, where communicating with the base station may be based on determining the second set of frequency resources.

Some examples of the method, apparatuses, and non-transitory computer-readable medium described herein may further include operations, features, means, or instructions for comparing, with the threshold, a respective channel criterion of each frequency resource of a frequency resource allocation for the communications with the base station, where the second set of frequency resources includes one or more frequency resources of the frequency resource allocation that satisfy the threshold, and where determining the second set of frequency resources may be based on the comparing.

In some examples of the method, apparatuses, and non-transitory computer-readable medium described herein, the channel criterion includes an energy parameter, a channel capacity, a channel covariance matrix condition number, a channel covariance matrix determinant, a channel covariance matrix eigenvalue summation, a minimum channel covariance matrix eigenvalue, or any combination thereof.

In some examples of the method, apparatuses, and non-transitory computer-readable medium described herein, the rank adaptation parameter includes the threshold.

Some examples of the method, apparatuses, and non-transitory computer-readable medium described herein may further include operations, features, means, or instructions for transmitting, to the base station, an indication of a capability to support rank adaptation at the UE, where the control signaling may be received based on transmitting the indication.

In some examples of the method, apparatuses, and non-transitory computer-readable medium described herein, the control signaling further indicates a rank adaptation procedure may be applied for the communications with the base station.

In some examples of the method, apparatuses, and non-transitory computer-readable medium described herein, the first set of frequency resources include a first one or more subcarriers, a first one or more resource blocks, or a first one or more subbands and the second set of frequency resources include a second one or more subcarriers, a second one or more resource blocks, or a second one or more subbands.

In some examples of the method, apparatuses, and non-transitory computer-readable medium described herein, the one or more reference signals include a sounding reference signal, a demodulation reference signal, a channel state information reference signal, or any combination thereof.

In some examples of the method, apparatuses, and non-transitory computer-readable medium described herein, the control signaling may be received in a radio resource control message, a medium access control control element, a downlink control information message, or any combination thereof.

A method for wireless communications at a base station is described. The method may include receiving, from a UE, one or more reference signals, determining, based on a channel estimation procedure associated with the one or more reference signals received from the UE, a first rank for communicating with the UE in a first set of frequency resources and a second rank for communicating with the UE in a second set of frequency resources, the second rank being lower than the first rank, transmitting, to the UE, control signaling indicating a rank adaptation parameter for communications with the base station, the rank adaptation parameter based on determining the first rank and the second rank, and communicating with the UE in the first set of frequency resources according to the first rank and in the second set of frequency resources according to the second rank, the communicating based on the rank adaptation parameter.

An apparatus for wireless communications at a base station is described. The apparatus may include a processor, memory coupled with the processor, and instructions stored in the memory. The instructions may be executable by the processor to cause the apparatus to receive, from a UE, one or more reference signals, determine, based on a channel estimation procedure associated with the one or more reference signals received from the UE, a first rank for communicating with the UE in a first set of frequency resources and a second rank for communicating with the UE in a second set of frequency resources, the second rank being lower than the first rank, transmit, to the UE, control signaling indicating a rank adaptation parameter for communications with the base station, the rank adaptation parameter based on determining the first rank and the second rank, and communicate with the UE in the first set of frequency resources according to the first rank and in the second set of frequency resources according to the second rank, the communicating based on the rank adaptation parameter.

Another apparatus for wireless communications at a base station is described. The apparatus may include means for receiving, from a UE, one or more reference signals, means for determining, based on a channel estimation procedure associated with the one or more reference signals received from the UE, a first rank for communicating with the UE in a first set of frequency resources and a second rank for communicating with the UE in a second set of frequency resources, the second rank being lower than the first rank, means for transmitting, to the UE, control signaling indicating a rank adaptation parameter for communications with the base station, the rank adaptation parameter based on determining the first rank and the second rank, and means for communicating with the UE in the first set of frequency resources according to the first rank and in the second set of frequency resources according to the second rank, the communicating based on the rank adaptation parameter.

A non-transitory computer-readable medium storing code for wireless communications at a base station is described. The code may include instructions executable by a processor to receive, from a UE, one or more reference signals, determine, based on a channel estimation procedure associated with the one or more reference signals received from the UE, a first rank for communicating with the UE in a first set of frequency resources and a second rank for communicating with the UE in a second set of frequency resources, the second rank being lower than the first rank, transmit, to the UE, control signaling indicating a rank adaptation parameter for communications with the base station, the rank adaptation parameter based on determining the first rank and the second rank, and communicate with the UE in the first set of frequency resources according to the first rank and in the second set of frequency resources according to the second rank, the communicating based on the rank adaptation parameter.

In some examples of the method, apparatuses, and non-transitory computer-readable medium described herein, communicating with the UE may include operations, features, means, or instructions for transmitting, based on the rank adaptation parameter, first downlink signaling in the first set of frequency resources according to the first rank and second downlink signaling in the second set of frequency resources according to the second rank.

Some examples of the method, apparatuses, and non-transitory computer-readable medium described herein may further include operations, features, means, or instructions for encoding the first downlink signaling according to a first precoding parameter, where the first uplink signaling may be transmitted based on encoding the first uplink signaling and encoding the second downlink signaling according to the first precoding parameter or according to a second precoding parameter indicated in the control signaling, where the second uplink signaling may be transmitted based on encoding the second uplink signaling.

In some examples of the method, apparatuses, and non-transitory computer-readable medium described herein, communicating with the UE may include operations, features, means, or instructions for receiving, based on the rank adaptation parameter, first uplink signaling in the first set of frequency resources according to the first rank and second uplink signaling in the second set of frequency resources according to the second rank.

Some examples of the method, apparatuses, and non-transitory computer-readable medium described herein may further include operations, features, means, or instructions for demodulating the first uplink signaling according to a first precoding parameter and demodulating the second uplink signaling according to the first precoding parameter or according to a second precoding parameter indicated in the control signaling.

Some examples of the method, apparatuses, and non-transitory computer-readable medium described herein may further include operations, features, means, or instructions for determining the second set of frequency resources based on the channel estimation procedure, where the second set of frequency resources includes a quantify of frequency resources, and where the control signaling may be based on determining the second set of frequency resources.

In some examples of the method, apparatuses, and non-transitory computer-readable medium described herein, the rank adaptation parameter includes the quantity of frequency resources.

In some examples of the method, apparatuses, and non-transitory computer-readable medium described herein, the rank adaptation parameter indicates the quantity of frequency resources as a percentage of a frequency resource allocation for the communications with the base station.

Some examples of the method, apparatuses, and non-transitory computer-readable medium described herein may further include operations, features, means, or instructions for determining, based on the channel estimation procedure, a threshold associated with a channel criterion of a channel for communications with the UE and determining, based on the threshold, the second set of frequency resources, where the control signaling may be based on determining the second set of frequency resources.

Some examples of the method, apparatuses, and non-transitory computer-readable medium described herein may further include operations, features, means, or instructions for comparing, with the threshold, a respective channel criterion of each frequency resource of a frequency resource allocation for the communications with the base station, where the second set of frequency resources includes one or more frequency resources of the frequency resource allocation that satisfy the threshold, and where determining the second set of frequency resources may be based on the comparing.

Some examples of the method, apparatuses, and non-transitory computer-readable medium described herein may further include operations, features, means, or instructions for adjusting the threshold associated with the channel criterion of the channel and determining whether frequency resources of a frequency resource allocation for the communications with the base station passes a cyclic redundancy check based on adjusting the threshold, where determining the second set of frequency resources may be based on determining whether the frequency resources of the frequency resource allocation pass the cyclic redundancy check.

In some examples of the method, apparatuses, and non-transitory computer-readable medium described herein, the channel criterion includes an energy parameter, a channel capacity, a channel covariance matrix condition number, a channel covariance matrix determinant, a channel covariance matrix eigenvalue summation, a minimum channel covariance matrix eigenvalue, or any combination thereof.

In some examples of the method, apparatuses, and non-transitory computer-readable medium described herein, the rank adaptation parameter includes the threshold.

Some examples of the method, apparatuses, and non-transitory computer-readable medium described herein may further include operations, features, means, or instructions for determining the second set of frequency resources based on an optimization procedure, where the control signaling may be based on determining the second set of frequency resources.

In some examples of the method, apparatuses, and non-transitory computer-readable medium described herein, the optimization procedure includes a machine learning procedure, a constraint optimization procedure, an iterative hypothesis test procedure, a lookup table access procedure, or any combination thereof.

Some examples of the method, apparatuses, and non-transitory computer-readable medium described herein may further include operations, features, means, or instructions for receiving, from the UE, an indication of a capability to support rank adaptation at the UE, where the control signaling may be transmitted based on receiving the indication.

In some examples of the method, apparatuses, and non-transitory computer-readable medium described herein, the control signaling further indicates a rank adaptation procedure may be applied for the communications with the base station.

In some examples of the method, apparatuses, and non-transitory computer-readable medium described herein, the first set of frequency resources include a first one or more subcarriers, a first one or more resource blocks, or a first one or more subbands and the second set of frequency resources include a second one or more subcarriers, a second one or more resource blocks, or a second one or more subbands.

In some examples of the method, apparatuses, and non-transitory computer-readable medium described herein, the one or more reference signals include a sounding reference signal, a demodulation reference signal, a channel state information reference signal, or any combination thereof.

In some examples of the method, apparatuses, and non-transitory computer-readable medium described herein, the control signaling may be received in a radio resource control message, a medium access control control element, a downlink control information message, or any combination thereof.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

DETAILED DESCRIPTION

Figure 1:
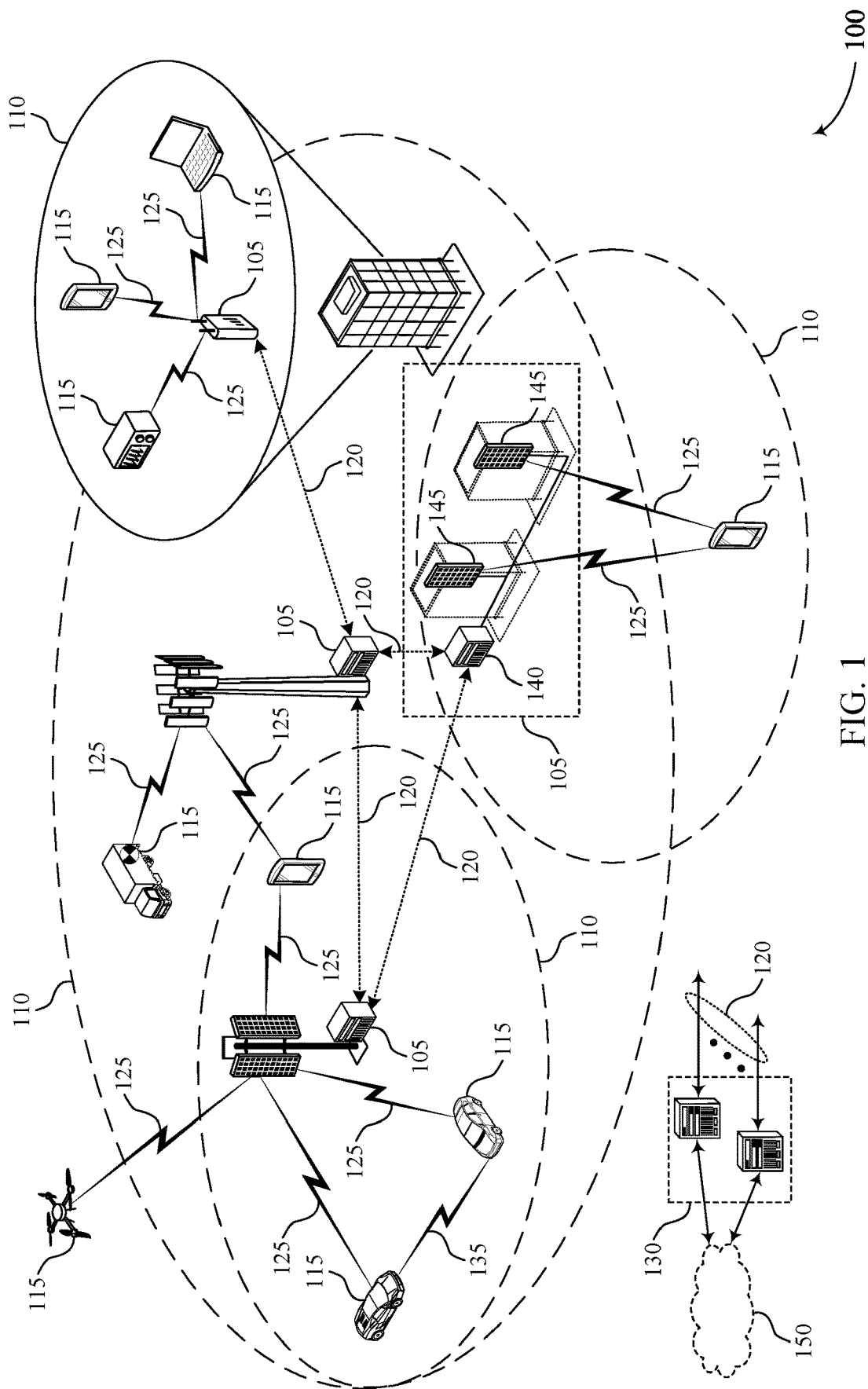
FIG. 1 illustrates an example of a wireless communications system that supports techniques for channel aware rank adaptation in accordance with aspects of the present disclosure.

Some wireless communications systems may utilize multiple frequency resources (e.g., subcarriers, resource blocks (RBs), or subbands) for communications between wireless devices. For example, in frequency range 1 (FR1, which may include frequencies between 410 megahertz (MHz) and 7.125 gigahertz (GHz)) and higher bands, wireless devices may receive channel allocations that allow communications over multiple frequency resources, improving latency and channel throughput. To maintain robust and low latency communications, the wireless devices may obtain channel information based on one or more reference signals. For example, a base station may obtain uplink channel information corresponding to a communication link with a user equipment (UE) based on a sounding reference signal (SRS) transmitted from the UE. Likewise, the UE may obtain downlink channel information from the base station via one or more reference signals, such as demodulation reference signal (DMRS) or channel state information reference signal (CSI-RS).

In some examples, there may be a channel reciprocity between an uplink channel and a downlink channel within the wireless communication link, where both the uplink channel and the downlink channel are allocated multiple subcarriers. Channel reciprocity may enable the UE and the base station to gain channel knowledge to optimize communications over the subcarriers. For example, the base station may determine a rank (e.g., corresponding to a number of spatial layers used in multiple-input multiple-output (MIMO) communications) for the frequency resources allocated for the uplink channel. Using channel reciprocity, the base station may also determine a rank for the frequency resources allocated for the downlink channel.

In some cases, however, assigning a same rank to each of the allocated frequency resources may reduce channel reliability or available throughput. For example, one or more frequency resources within the allocated frequency resources may experience fading in the frequency domain, which may reduce the rank for the one or more frequency resources. In such cases, other frequency resources may support communications using a greater rank than the single assigned rank for the allocated frequency resources, which may reduce channel reliability or throughput.

The present disclosure provides techniques to dynamically assign respective ranks for allocated frequency resources. Specifically, the techniques described herein provide for wireless devices within a wireless communications system to assign different ranks to different frequency resources. Further, the present disclosure describes techniques for leveraging the increased resolution of channel rank assignment to improve throughput on frequency resources that support a higher rank.

In some examples, the base station may determine a respective rank per frequency resource and signal to the UE the quantity of frequency resources (e.g., as a percentage of the allocated frequency resource, a ratio, or another representation of the quantity) that use each rank. Additionally or alternatively, the base station may utilize at least one threshold to assign ranks to frequency resources. The base station may signal the at least one threshold to the UE.

Aspects of the disclosure are initially described in the context of wireless communications systems. Aspects of the disclosure are further illustrated by and described with reference to a capacity plot and a process flow. Aspects of the disclosure are further illustrated by and described with reference to apparatus diagrams, system diagrams, and flowcharts that relate to techniques for channel aware rank adaptation.

FIG. 1 illustrates an example of a wireless communications system 100 that supports techniques for channel aware rank adaptation in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, MIMO communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multi-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

The described techniques relate to dynamic rank assignment of allocated frequency resources under channel reciprocity assumptions. Generally, the techniques described in herein may provide for wireless devices within a wireless communications system to assign different ranks to different subcarriers. Further, the present disclosure describes techniques for leveraging the increased resolution of channel ranking to improve throughput by dynamically assigning different ranks to subcarriers according to one or more joint criteria shared between two or more wireless devices.

In some examples, wireless devices within a wireless communications system may independently assign ranks for frequency resources of a frequency resource allocation. For example, a base station 105 may receive an SRS from a UE 115 where channel reciprocity exists between the UE 115 and the base station 105. Based on the SRS and the channel reciprocity, the base station 105 may obtain channel knowledge of a downlink channel. The base station 105 may apply dynamic channel rank assignment to adapt respective ranks of the frequency resources according to the channel conditions (e.g., channel fading). In some examples, the base station 105 may not signal the ranks of frequency resources due to channel reciprocity (e.g., both the base station 105 and the UE 115 are aware of the conditions of both the uplink channel and the downlink channel) and the use of a common algorithm with joint criteria for choosing the rank per frequency resources. In other examples, the base station 105, the UE 115, or both, may indicate to the other a quantity of subcarriers assigned different ranks, a threshold to utilize as a metric for rank assignment, or both.

Figure 2:
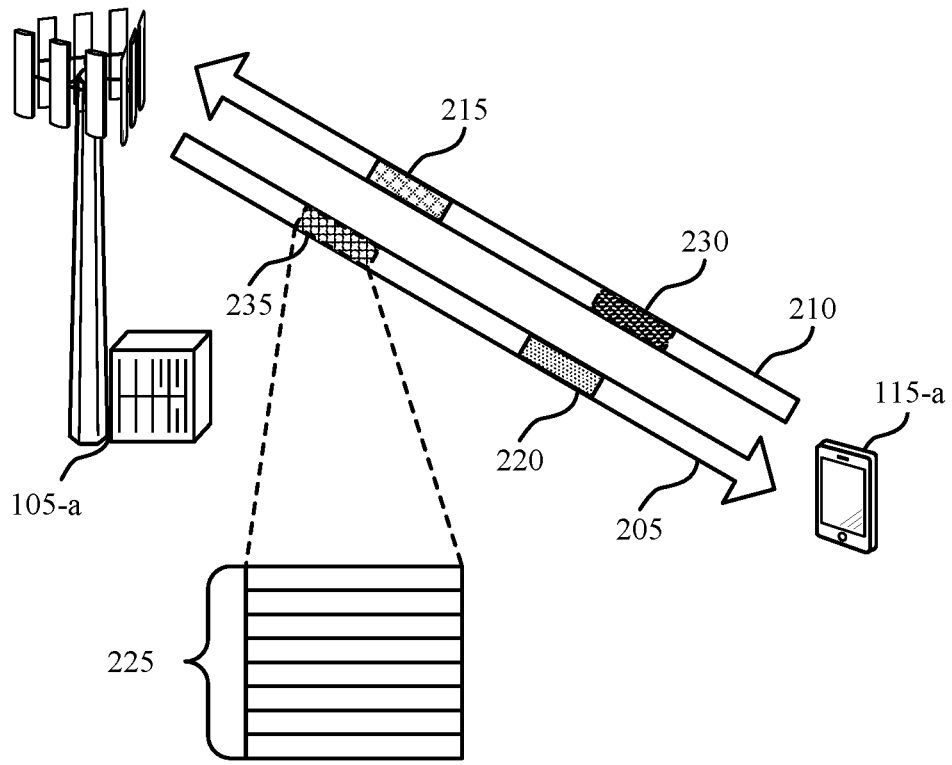
FIG. 2 illustrates an example of a wireless communications system that supports techniques for channel aware rank adaptation in accordance with aspects of the present disclosure.

FIG. 2 illustrates an example of a wireless communications system 200 that supports techniques for channel aware rank adaptation in accordance with aspects of the present disclosure. The wireless communications system 200 may include a base station 105-a and a UE 115-a, which may be examples of a base station 105 and a UE 115 as described with reference to FIG. 1. While signaling operations may be discussed below as being performed by particular wireless devices, the operations, techniques, and computations may be performed by any number of wireless devices as well as different wireless devices than those discussed below.

The UE 115-a and the base station 105-a may perform communications over a wireless communications link corresponding to allocated resources. For example, the base station 105-a may communicate with the UE 115-a over a downlink channel 205. Similarly, the UE 115-a may communicate with the base station 105-a over an uplink channel 210. In some cases, the wireless communications system 200 may enable communications in FR1 and higher bands. In some examples, multiple frequency resources may be allocated to the uplink channel 210 and the downlink channel 205 to support communications between the base station 105-a and the UE 115-a.

Additionally, channel reciprocity may exist between the downlink channel 205 and the uplink channel 210. That is, the uplink channel 210 and the downlink channel 205 may share similar channel characteristics such that knowledge of both channels may be obtained at a wireless device. For example, the base station 105-a may obtain information for the downlink channel 210 via one or more reference signals 215 received from the UE 115-a. In some cases, the reference signal 215 may be an SRS. The base station 105-a may obtain knowledge of the downlink channel 205 based on channel reciprocity by estimating a channel response for the uplink channel 210 based on the reference signal 215.

The present disclosure discusses techniques for increasing the resolution of rank assignment for frequency resources 225 such that the UE 115-a and the base station 105-a may dynamically assign ranks to frequency resources 225 to increase signal throughput. The frequency resources 225 may include subcarriers, RBs, subbands, or some combination thereof. In some examples, dynamically assigning ranks to frequency resources 225 allocated for communications may be performed with no additional signaling (rather than indicating a rank for each frequency resource 225). For example, the present disclosure discusses techniques to apply a dynamic rank per frequency resource 225, where a lower rank may be assigned to frequency resources 225 with channel fading without signaling actual locations of the frequency resources 225 (e.g., estimated at the UE 115-a and the base station 105-a). In some cases, an indication of a quantity of frequency resources 225 assigned to a lower rank, a higher rank, or both, may be transmitted within the wireless communications system 200. Additionally or alternatively, a threshold (e.g., joint criteria) may be indicated, where a wireless device may compare a channel parameter of frequency resources 225 with the threshold for dynamic rank assignment.

To accomplish the dynamic rank assignment for the frequency resources 225, the UE 115-a may transmit an indication, to the base station 105-a, that the UE 115-a supports dynamic rank assignment. The base station 105-a may transmit a control signal 220 to the UE 115-a indicating or activating the dynamic rank assignment. The UE 115-a may transmit the reference signal 215 to the base station 105-a, where the base station 105-a may leverage channel reciprocity assumptions to estimate the downlink channel 205. Based on the reference signal 215, the base station 105-a may determine the dynamic rank assignment for the frequency resources 225 using one or more mathematical techniques.

In some examples, the base station 105-a may determine the dynamic rank assignment by iteratively changing thresholds, adding noise according to a reported signal-to-interference-plus-noise ratio (SINR), and testing if the frequency resources 225 pass a CRC. In some cases, the base station 105-a may signal a quantity of frequency resources 225 that use each rank, the thresholds to be used (e.g., per rank, per eigenvalues of the frequency resources 225) for the dynamic rank assignment, or both. Additionally or alternatively, the base station 105-a may employ machine learning, constrained or unconstrained optimization, hypothesis testing, a look-up-table (LUT), a different method, or any combination thereof, to dynamically assign ranks for the allocated frequency resources 225. These methods may be used to identify a location metric for improving performance with respect to dynamically assigned ranks. For example, the metrics used may include a minimal channel energy, a channel capacity, a channel covariance matrix condition number, a channel covariance matrix determinant, a channel covariance matrix eigenvalue summation, channel covariance matrix minimal eigenvalue, or some other metric. Based on the chosen method or methods, coupled with one or more metrics, the base station 105-a may compute ranks dynamically per frequency resource 225.

The base station 105-a may transmit a report in the control signal 220 (e.g., via an RRC message, downlink control information (DCI), or MAC control element (MAC-CE)) to the UE 115-a configuring adaptive rank downlink signaling 235. The control signal 220 may include an indication of whether dynamic rank assignment (e.g., adaptive channel awareness) is applied or not for the adaptive rank downlink signaling 235, a quantity of frequency resources 225 assigned to each rank in the adaptive rank downlink signaling 235, and a method to indicate to the UE 115-a how to find the locations of the indicated frequency resources 225. For example, the base station 105-a may transmit a percentage of available frequency resources 225 that are assigned a lower rank. Additionally or alternatively, the base station 105-a may signal the quantity of frequency resources 225 that are assigned the lower rank using a ratio, a number, or some other representation identifying the quantity of frequency resources 225 that are assigned the lower rank.

In some examples, the base station 105-a may insert the determined rank per frequency resource 225 and update a code rate (or transfer block size) accordingly. For example, the base station 105-a may utilize a same precoding for each frequency resource 225 and, for the frequency resources 225 that are assigned the lower rank, assume that a last layer or relative layer to computed eigenvalues is 0. Additionally or alternatively, the base station 105-a may indicate, to the UE 115-a, that a different precoding is utilized for the frequency resources 225 that are assigned the lower rank. For example, the base station 105-a may utilize singular value decomposition (SVD) precoding, which may enable efficient separation of layers within frequency resources 225 and dynamic rank assignment corresponding to the eigenvalues of the frequency resources 225.

The UE 115-a may receive the frequency resources 225 in the adaptive rank downlink signaling 235, along with the report in the control signal 220, which may indicate the quantity of frequency resources 225 that are assigned the lower rank and the appropriate rank (e.g., the standard rank applied to the frequency resources 225). The quantity of frequency resources 225 may be relative to the allocation. In some cases, the report may include a threshold per rank that is defined to determine the assigned rank of the frequency resources 225. The threshold may be defined based on a capacity or on eigenvalues of a frequency domain channel covariance matrix. For example, the threshold may be one threshold that compares eigenvalues, and if an eigenvalue is below the threshold, the frequency resource 225 corresponding to the eigenvalue will be assigned a rank reduced by one. Additionally or alternatively, the threshold may be based on actual values measured at the base station 105-a or relative to an average channel metric value.

In response to the report in the control signal 220 and the adaptive rank downlink signaling 235 (e.g., a physical downlink shared channel (PDSCH) transmission), the UE 115-a may estimate the equivalent response of the downlink channel 205 (as compared to the channel response measured at the base station 105-a) post precoding and equalization. The UE 115-a perform a similar analysis of the frequency resources 225 (e.g., using a DMRS received from the base station 105-a, DCI, or both) using joint criteria (e.g., the same technique and metrics used by the base station 105-a to assign dynamic ranks to the frequency resources 225). For example, the UE 115-a may obtain information for the frequency resources 225 by computing the locations of a minimal channel energy, channel capacity, channel covariance matrix condition number, channel covariance matrix determinant, channel covariance matrix eigen value summation, channel covariance matrix minimal eigen value, or some other metric or combination of metrics, where the method of obtaining and comparing metrics may be a common algorithm used by both the UE 115-a and the base station 105-a. The UE 115-a may estimate the criteria or metrics and subsequently estimate the rank per frequency resource 225 utilizing information from the report. For example, the UE 115-a may estimate the rank per frequency resource 225 based on a threshold criteria, based on choosing the frequency resources 225 with the lowest metric values in concert with a signaled percentage of frequency resources 225 that are assigned the lower rank from the base station 105-a, or both.

The UE 115-a may demodulate the tones of frequency resource 225 with the lower rank and continue a decoding procedure In some examples, the UE 115-a may assume a same precoding for each frequency resource 225 and, for the frequency resources 225 that are assigned the lower rank, assume that a last layer or relative layer to computed eigenvalues is 0. Additionally or alternatively, the base station 105-a may define the lower rank precoding (e.g., in the control signal 220). In some cases, the UE 115-a may receive an indication that SVD precoding is utilized for the frequency resources 225.

In some examples, the UE 115-a may transmit adaptive rank uplink signaling 230 using similar mechanisms as those described herein for throughput performance enhancement at the UE 115-a. To support this, the base station 105-a may indicate, to the UE 115-a, a percentage of frequency resources 225 of the adaptive rank uplink signaling 230 that may use dynamic rank assignment. Based on the common algorithm, joint criteria, and the dynamic rank assignment, the UE 115-a may transmit the adaptive rank uplink signaling 230 (e.g., a physical uplink shared channel (PUSCH) transmission) to the base station 105-a.

Based on the signaling operations, the techniques described herein may be performed periodically, every communication, statically set, or some combination thereof. The operations may be performed by different devices in different orders, along with different metrics and common algorithms to enable dynamic rank estimation at wireless devices with no additional signaling overhead.

Figure 3:
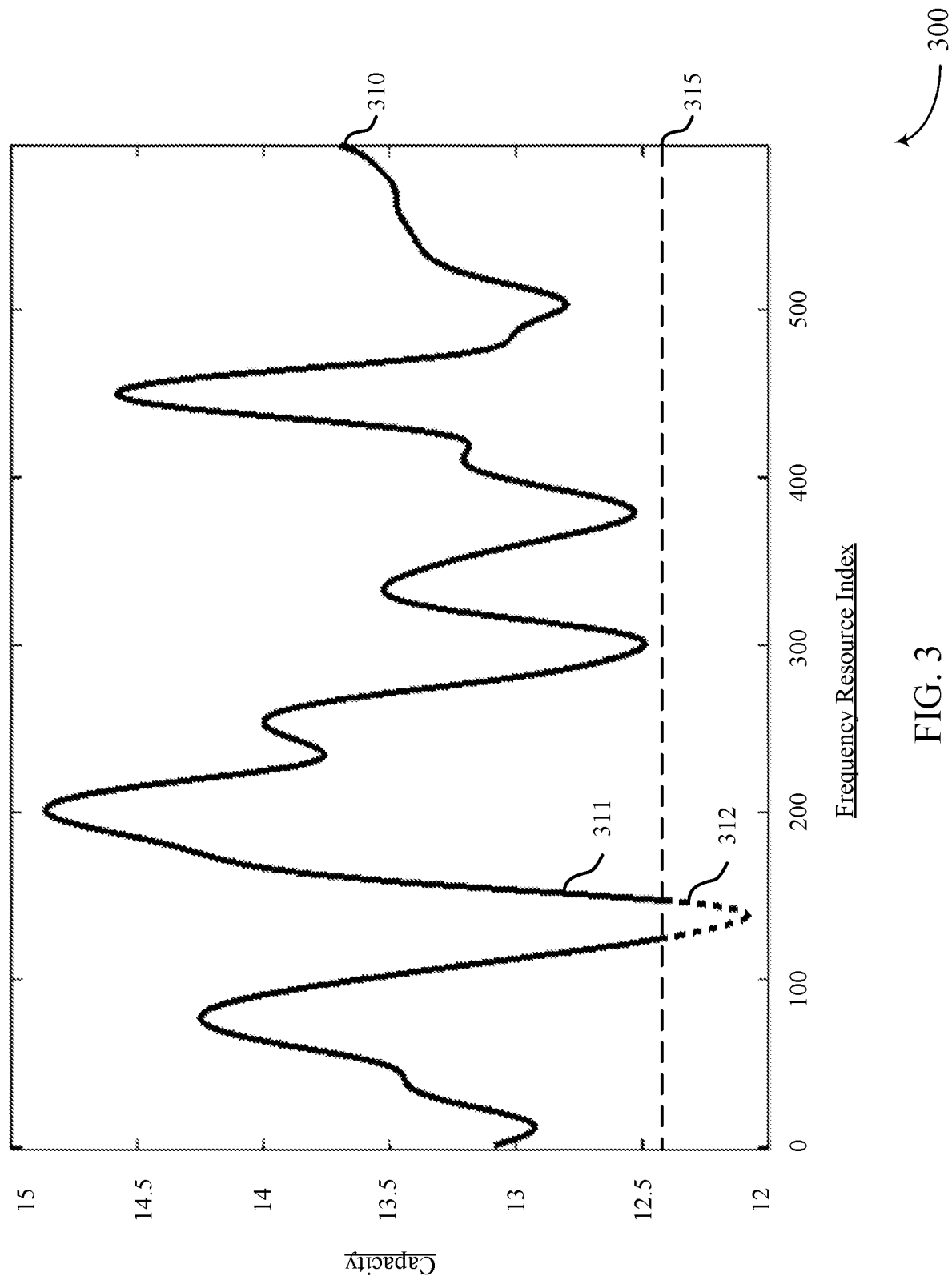
FIG. 3 illustrates an example of a capacity plot that supports techniques for channel aware rank adaptation in accordance with aspects of the present disclosure.

FIG. 3 illustrates an example of a capacity plot 300 that supports techniques for channel aware rank adaptation in accordance with aspects of the present disclosure. The capacity plot 300 may be implemented by one or more wireless devices, such as a base station and a UE, which may be examples of a base station 105 and a UE 115 as described with reference to FIG. 1. In some examples, the capacity plot 300 may be based on one or more operations, signals, and procedures associated with the base station and the UE. While specific signaling operations, mathematical techniques, and joint metrics are discussed below, the signaling operations between various devices may be performed in a different order than the example order shown, or the operations performed by the devices may be performed by different devices or at different times. Additionally, while exemplary mathematical techniques and joint metrics are discussed, the techniques discussed below are not limited to a closed set of mathematical techniques or metrics; the capacity plot 300 may be associated with any appropriate combination of mathematical techniques or metrics.

To enable dynamic rank assignment of multiple frequency resources within a wireless communication system, one or more wireless devices may utilize a common algorithm and one or more joint criteria for dynamic rank assignment (e.g., to determine how many layers to use for communication over a given frequency resource) to enable efficient usage of allocated frequency resources. For example, a base station and a UE may share a common algorithm, allowing both the base station and the UE to independently estimate ranks for frequency resources. For example, a base station may receive an SRS from the UE, where the base station may leverage channel reciprocity coupled with the received SRS to estimate a downlink channel. The base station may use the channel estimate as an input to the common algorithm to perform dynamic rank assignment of available frequency resources. In some cases, the base station may utilize the outputs of the common algorithm for comparison to one or more joint criteria (e.g., metrics) to assign lower ranks and higher ranks.

In some cases, the base station may utilize the common algorithm to determine a percentage of frequency resources assigned a lower rank. Based on the determination, the base station may insert a rank per frequency resource and update the coding rate accordingly (e.g., using SVD precoding). Additionally or alternatively, the base station may determine a percentage of frequency resources assigned a higher rank. In some cases, the base station may determine a ratio, number, or any other representation of the frequency resources assigned a dynamic rank for indication to the UE.

In some examples, the base station may find the locations of the frequency resources assigned the higher rank by performing one or more mathematical operations within the frequency domain of the allocated frequency resources. In some cases, the base station (e.g., a gNB) may identify a metric for estimating the frequency resources assigned the lower rank. For example, the base station may compute a channel covariance matrix condition number (e.g., where the computation is the common algorithm) based at least in part on the channel estimate obtained from the SRS while leveraging channel reciprocity:

$$cond(E[H_{mXn}H_{mXn}^H])) = \max(eig(E[H_{mXn}H_{mXn}^H]))) \quad (1)$$
$$/\min(eig(E[H_{mXn}H_{mXn}^H]))),$$

where H is a channel estimate, m represents a number of received digital streams (e.g., estimated through the received SRS), n represents the number of transmission ports or layers, $H_{m\times n}^H$ is the Hermitian conjugate of $H_{m\times n}$, E[x] is the expectation value of x, and eig(x) is the set of eigenvalues of x. The base station may utilize one or more joint criteria to compare the outputs from Equation 1 to assign frequency resources higher and lower ranks.

In another example, the base station may utilize the determinant of the expected value of the channel estimate multiplied with the Hermitian conjugate of the channel estimate as the common algorithm with joint criteria scaled accordingly:

$$\det(E[H_{m\times n}H_{m\times n}^H])) \quad (2)$$

In another example, the base station may utilize a sum of eigenvalues for the common algorithm with joint criteria scaled accordingly:

$$\text{sum}(eig(E[H_{m\times n}H_{m\times n}^H]))). \quad (3)$$

By examining the summation of the eigenvalues of H, the base station may determine a dynamic rank per frequency resource. In some cases, the base station may use the output of Equation 3 to determine a quantity of frequency resources to be assigned a reduced rank. For example, the base station may assign a lower rank to 5% of the available frequency resources. In some cases, the base station may signal to the UE the percentage of frequency resources assigned the lower rank. Based on the percentage, the UE may determine the locations of the frequency resources assigned the lower rank.

In another example, the base station may utilize a minimum of the eigenvalues of H, where the base station may determine ranks (e.g., how many layers are available) per frequency resource:

$$\min(eig[H_{m\times n}H_{m\times n}^H]))) \quad (4)$$

The base station may utilize Equation 4 to determine not only which subcarriers are to be assigned a higher rank and which subcarriers are to be assigned a lower rank, but also determine the difference between eigenvalues of H. For example, if there is a large difference between any two eigenvalues of H, using the larger and smaller eigenvalues may impact the modulation and coding scheme (MCS) of a transmission on the frequency resources.

In some examples, the base station may calculate the expectation value $E[H_{m\times n}H_{m\times n}^H]$ for one or more OFDM symbols, on one or more channels, or both. Additionally or alternatively, the base station may calculate one or more metrics without the expectation value to identify the locations of the frequency resources assigned the higher rank or the lower rank. That is, each instance of $E[H_{m\times n}H_{m\times n}^H]$ may be replaced with $H_{m\times n}H_{m\times n}^H$ in any or each of Equations 1 through 4.

In an example, if there exists four transmission channels and four receiver channels, the channel may be represented by a 4×4 matrix. If eigenvalues are computed for the four transmission channels and the four receiver channels, four plots may be generated characterizing the strength of the eigenvalues. The base station may define a threshold or a minimum quantity of frequency resources from a criteria or metric which may be used to determine which frequency are to be assigned a lower rank. For example, the base station may perform a comparison of the eigenvalue plots to a threshold, which may enable dynamic rank assignment per frequency resource.

To further elucidate the use of a common algorithm and joint criteria as discussed above, the capacity plot 300 illustrates the use of capacity and a predefined threshold to assign higher or lower ranks to frequency resources. In the example that follows, while a computed capacity 310 is compared with a threshold 315, more than one threshold may be implemented by the wireless communications system. The capacity plot 300 may be computed by any number of wireless devices under channel reciprocity assumptions to perform dynamic rank assignment per frequency resource. For example, the base station and the UE (e.g., transmitter and receiver) may identify a set 312 of frequency resources assigned a lower rank based on a frequency domain channel estimation. The capacity plot 300 may be generated using a mathematical technique illustrated by Equation 5:

$$\text{capacity} = \log_2(\det(I_{nXn} + H_{mXn}^H R_{mm}^{-1} H_{mXn})) \underset{\substack{\text{assuming no}\\ \text{Rx correlation}}}{=} \quad (5)$$

$$\log_2\left[\det\left(I_{nXn} + \underbrace{\frac{H_{mXn}^H H_{mXn}}{\sigma_N^2}}_{\text{by reported SINR}}\right)\right],$$

where $I_{n\times n}$ is an identity matrix of size n, $R_{mm}^{-1}$ is an interference covariance matrix for the channel, and $\sigma_N^2$ represents an error derived from a reported SINR. Equation 5 may be used by the base station and the UE to generate a computed capacity 310, which may illustrate capacity vs. a frequency index of available frequency resources. The computed capacity 310 may be compared to a threshold 315 to determine which subcarriers, if any, are to be assigned the lower rank. For example, if any frequency resources of the computed capacity 310 are below the threshold 315, such as the set 312 of frequency resources, the assigned rank of the corresponding frequency resources may be reduced by one. For example, a set 311 of frequency resources with a computed capacity 310 greater than the threshold 315 may be assigned a rank 4, and the set 312 of frequency resources with a computed capacity 310 less than the threshold 315 may be assigned a rank 3. In some cases, there may be more than one threshold 315 (not shown). In such a case, if a frequency resource computed capacity 310 is below a first threshold and a second threshold, the assigned rank of the corresponding subcarrier may be reduced by two.

Figure 4:
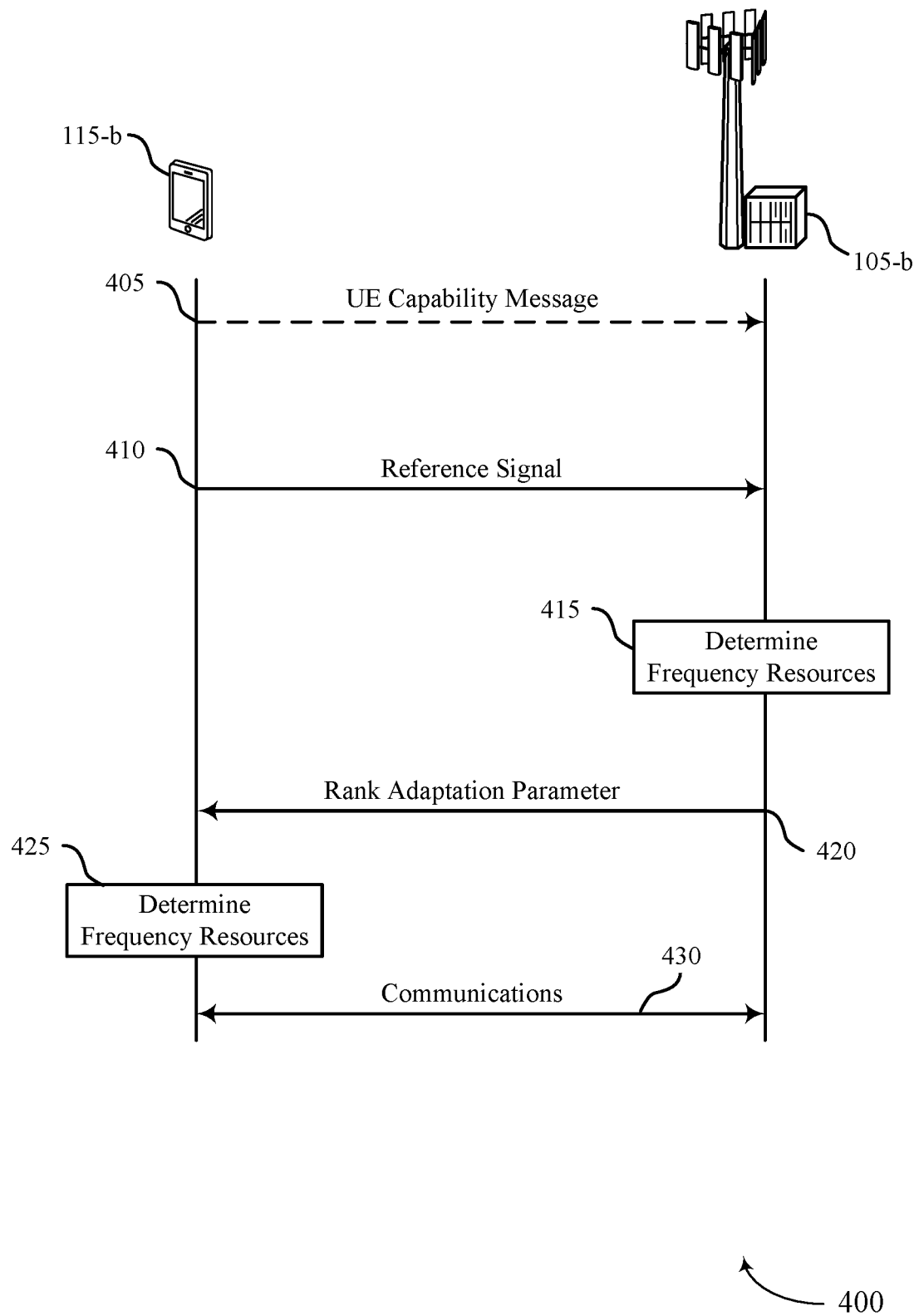
FIG. 4 illustrates an example of a process flow that supports techniques for channel aware rank adaptation in accordance with aspects of the present disclosure.

FIG. 4 illustrates an example of a process flow 400 that supports techniques for channel aware rank adaptation in accordance with aspects of the present disclosure. In some examples, the process flow 400 may implement aspects of the wireless communications systems 100 and 200. For instance, the process flow 400 may illustrate operations between a base station 105-*b* and a UE 115-*b*, which may each be examples of the corresponding devices described with reference to FIGS. 1 and 2. In some examples, the signaling operations between various devices may be performed in a different order than the example order shown, or the operations performed by the devices may be performed by different devices or at different times. Additionally, while exemplary mathematical techniques and joint metrics may be discussed, the techniques discussed below are not limited to a closed set of mathematical techniques or metrics; the process flow 400 may be accomplished with any combination of mathematical techniques or metrics.

At 405, the UE 115-*b* may optionally transmit a UE capability message to the base station 105-*b* indicating a capability to support dynamic rank assignment for frequency resources in accordance with aspects of the present disclosure. The base station 105-*b* and the UE 115-*b* may perform dynamic rank assignment utilizing a common algorithm and one or more joint criteria as discussed herein. Notably, channel reciprocity may be leveraged by the base station 105-*b* and the UE 115-*b* to perform dynamic rank assignment. Based on the UE capability message, the base station 105-*b* may perform dynamic rank assignment in concert with the UE 115-*b*. In some cases, the dynamic rank assignment may be performed by the UE 115-*b* and the base station 105-*b* without additional signaling overhead.

At 410, the UE 115-*b* may transmit a reference signal to the base station 105-*b*. In some examples, the reference signal may be an SRS. The base station 105-*b* may leverage the received reference signal and channel reciprocity assumptions to estimate a downlink channel corresponding to the UE 115-*b*.

At 415, the base station 105-*b* may determine frequency resources and assign dynamic ranks per frequency resource based on the reference signals transmitted from the UE 115-*b* at 410. As described herein, the base station 105-*b* may utilize one or more mathematical operations (e.g., a common algorithm) and joint criteria to perform dynamic rank assignment. For example, the base station 105-*b* may determine a first rank for communicating with the UE 115-*b* in a first set of frequency resources and a second rank for communicating with the UE 115-*b* using a second set of frequency resources, where the second rank may be lower than the first rank.

At 420, the base station 105-*b* may transmit to the UE 115-*b* a rank adaptation parameter (e.g., via control signaling) after assigning computed dynamic ranks to the frequency resources within a resource allocation. The base station 105-*b* may continue OFDM operations with the UE 115-*b* utilizing the computed dynamic ranks. In some cases, as those discussed herein, the base station 105-*b* may transmit an indication of the number of frequency resources assigned a lower rank, one or more thresholds, or both, to the UE 115-*b*.

At 425, the UE 115-*b* may determine the frequency resources and dynamic ranks per frequency resource. In some examples, the UE 115-*b* may determine the dynamic rank assignment independently (e.g., without additional signaling overhead from the base station 105-*b*). In some cases, the UE 115-*b* may utilize the number of frequency resources assigned the lower rank as indicated by the base station 105-*b* to perform dynamic rank assignment. Additionally or alternatively, the UE 115-*b* may utilize one or more thresholds indicated by the base station 105-*b* to perform dynamic rank assignment.

At 430, the UE 115-*b* and the base station 105-*b* may perform communication operations over allocated resources (e.g., the first set of frequency resources and the second set of frequency resources) while utilizing the dynamic ranks assignment. In some cases, the dynamic rank assignment may occur for each downlink or uplink communication. In other cases, the dynamic rank assignment may be utilized for an amount of time or for the duration of a scheduled communication.

Figure 5:
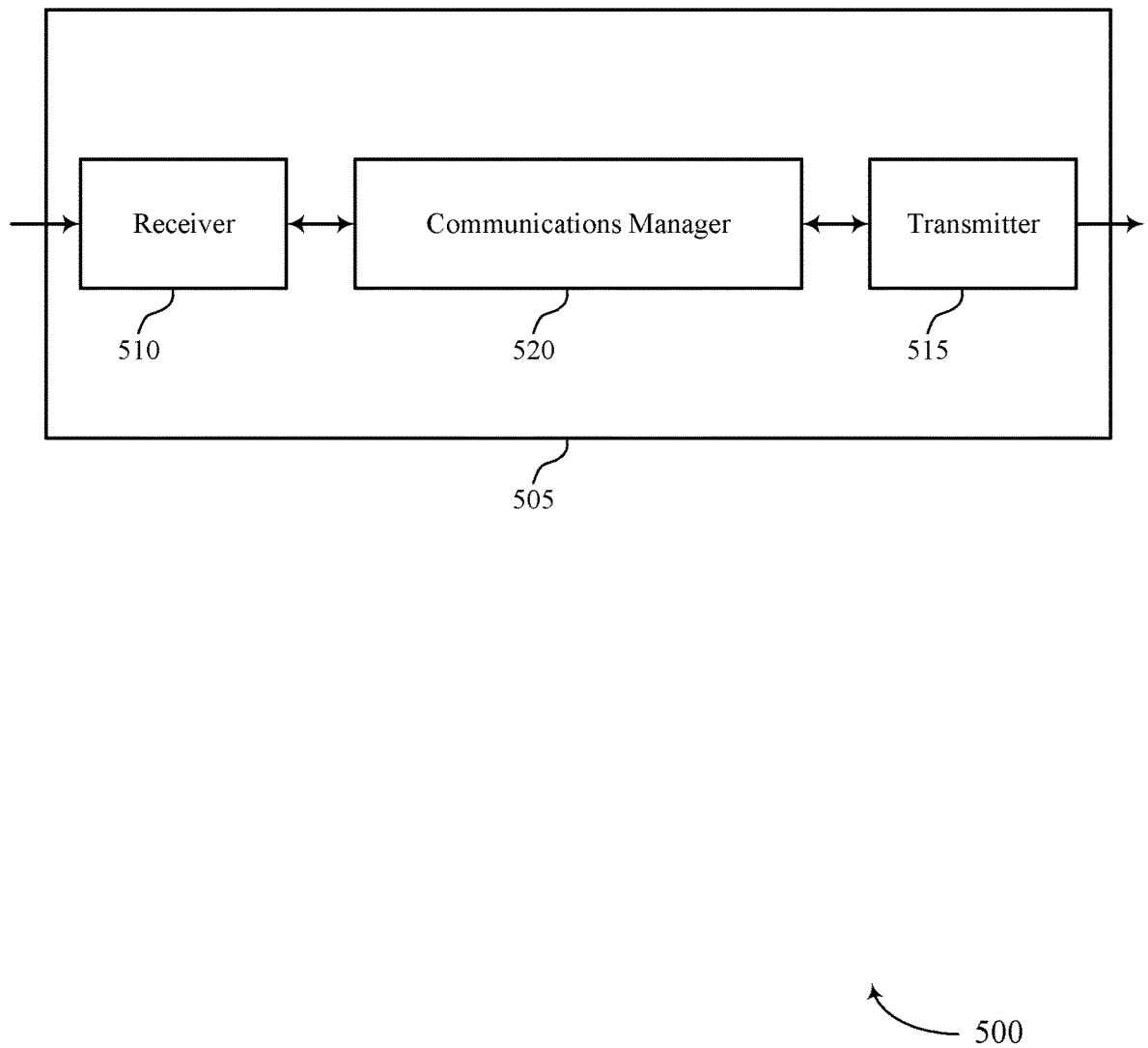
FIGS. 5 and 6 show block diagrams of devices that support techniques for channel aware rank adaptation in accordance with aspects of the present disclosure.

FIG. 5 shows a block diagram 500 of a device 505 that supports techniques for channel aware rank adaptation in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to techniques for channel aware rank adaptation). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to techniques for channel aware rank adaptation). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of techniques for channel aware rank adaptation as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communications at a UE in accordance with examples as disclosed herein. For example, the communications manager 520 may be configured as or otherwise support a means for transmitting, to a base station, one or more reference signals. The communications manager 520 may be configured as or otherwise support a means for receiving control signaling indicating a rank adaptation parameter for communications with the base station, where the rank adaptation parameter is based on the one or more reference signals. The communications manager 520 may be configured as or otherwise support a means for determining, based on receiving the rank adaptation parameter, a first rank for communicating with the base station in a first set of frequency resources and a second rank for communicating with the base station in a second set of frequency resources, the second rank being lower than the first rank. The communications manager 520 may be configured as or otherwise support a means for communicating with the base station in the first set of frequency resources according to the first rank and in the second set of frequency resources according to the second rank.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for leveraging a common algorithm and joint criteria to enable adaptive rank assignment for frequency resources without additional signaling overhead.

Figure 6:
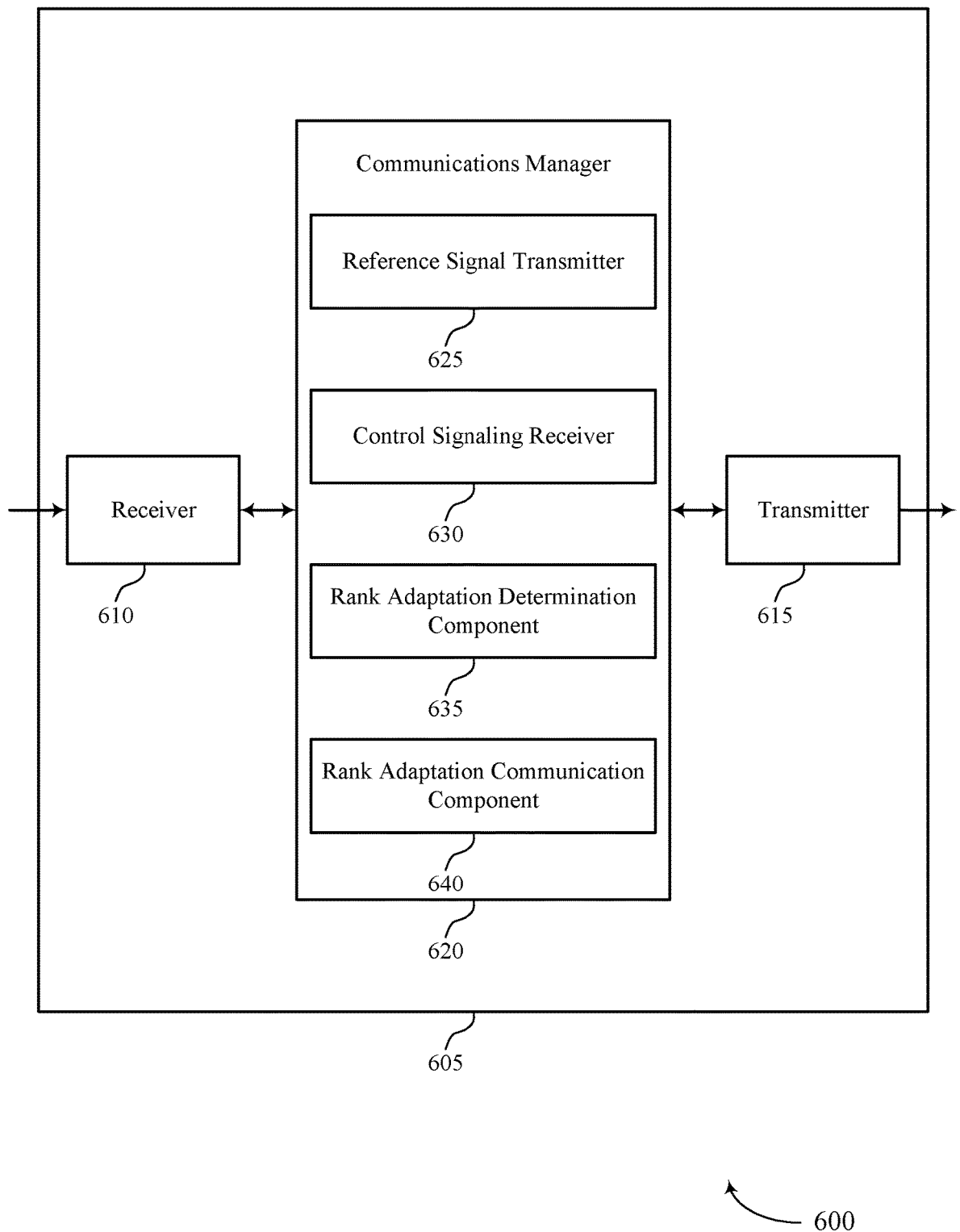

FIG. 6 shows a block diagram 600 of a device 605 that supports techniques for channel aware rank adaptation in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to techniques for channel aware rank adaptation). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to techniques for channel aware rank adaptation). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of techniques for channel aware rank adaptation as described herein. For example, the communications manager 620 may include a reference signal transmitter 625, a control signaling receiver 630, a rank adaptation determination component 635, a rank adaptation communication component 640, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communications at a UE in accordance with examples as disclosed herein. The reference signal transmitter 625 may be configured as or otherwise support a means for transmitting, to a base station, one or more reference signals. The control signaling receiver 630 may be configured as or otherwise support a means for receiving control signaling indicating a rank adaptation parameter for communications with the base station, where the rank adaptation parameter is based on the one or more reference signals. The rank adaptation determination component 635 may be configured as or otherwise support a means for determining, based on receiving the rank adaptation parameter, a first rank for communicating with the base station in a first set of frequency resources and a second rank for communicating with the base station in a second set of frequency resources, the second rank being lower than the first rank. The rank adaptation communication component 640 may be configured as or otherwise support a means for communicating with the base station in the first set of frequency resources according to the first rank and in the second set of frequency resources according to the second rank.

Figure 7:
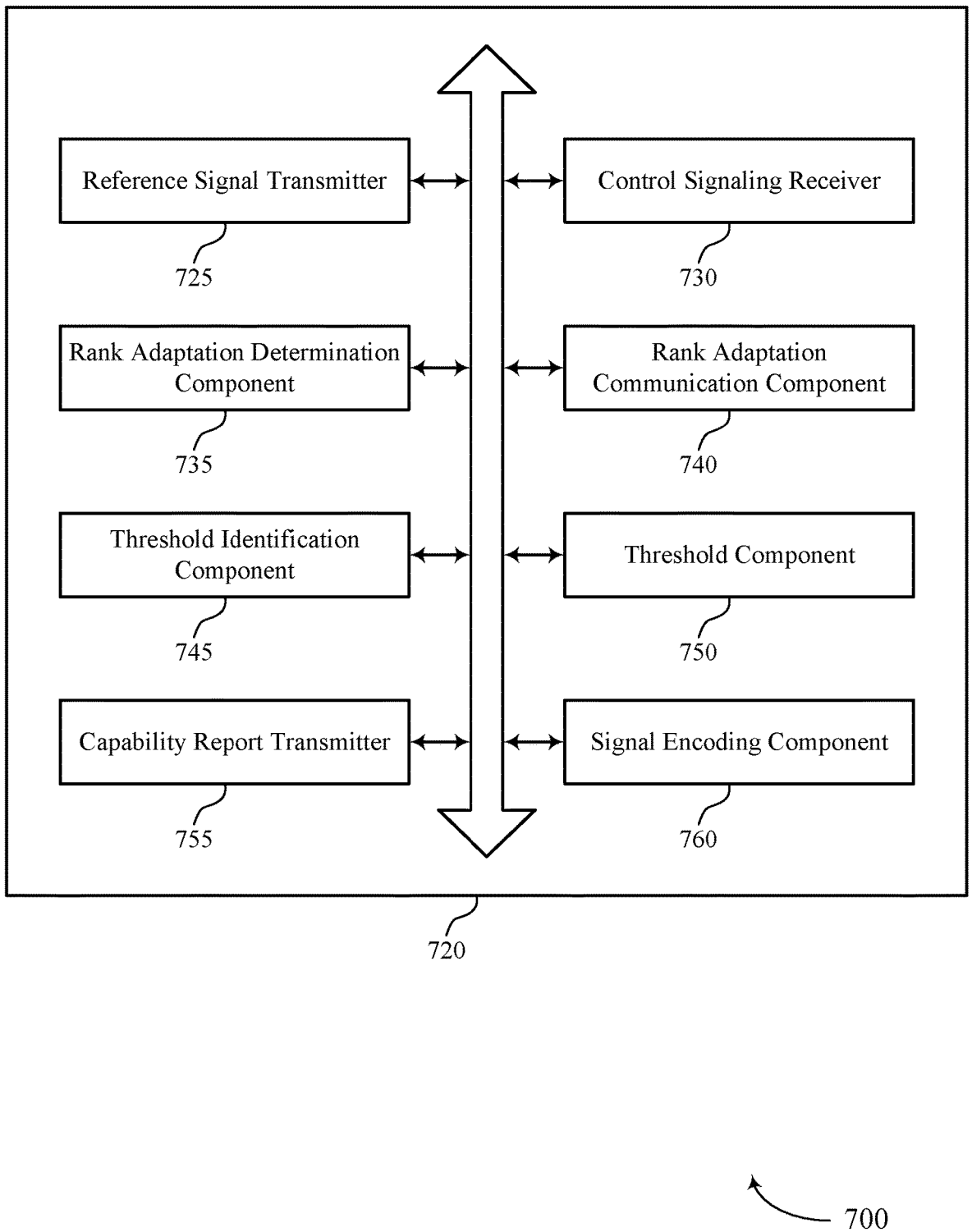
FIG. 7 shows a block diagram of a communications manager that supports techniques for channel aware rank adaptation in accordance with aspects of the present disclosure.

FIG. 7 shows a block diagram 700 of a communications manager 720 that supports techniques for channel aware rank adaptation in accordance with aspects of the present disclosure. The communications manager 720 may be an example of aspects of a communications manager 520, a communications manager 620, or both, as described herein. The communications manager 720, or various components thereof, may be an example of means for performing various aspects of techniques for channel aware rank adaptation as described herein. For example, the communications manager 720 may include a reference signal transmitter 725, a control signaling receiver 730, a rank adaptation determination component 735, a rank adaptation communication component 740, a threshold identification component 745, a threshold component 750, a capability report transmitter 755, a signal encoding component 760, or any combination thereof. Each of these components may communicate, directly or indirectly, with one another (e.g., via one or more buses).

The communications manager 720 may support wireless communications at a UE in accordance with examples as disclosed herein. The reference signal transmitter 725 may be configured as or otherwise support a means for transmitting, to a base station, one or more reference signals. The control signaling receiver 730 may be configured as or otherwise support a means for receiving control signaling indicating a rank adaptation parameter for communications with the base station, where the rank adaptation parameter is based on the one or more reference signals. The rank adaptation determination component 735 may be configured as or otherwise support a means for determining, based on receiving the rank adaptation parameter, a first rank for communicating with the base station in a first set of frequency resources and a second rank for communicating with the base station in a second set of frequency resources, the second rank being lower than the first rank. The rank adaptation communication component 740 may be configured as or otherwise support a means for communicating with the base station in the first set of frequency resources according to the first rank and in the second set of frequency resources according to the second rank.

In some examples, to support communicating with the base station, the rank adaptation communication component 740 may be configured as or otherwise support a means for receiving, based on the rank adaptation parameter, first downlink signaling in the first set of frequency resources according to the first rank and second downlink signaling in the second set of frequency resources according to the second rank.

In some examples, the rank adaptation communication component 740 may be configured as or otherwise support a means for demodulating the first downlink signaling according to a first precoding parameter. In some examples, the rank adaptation communication component 740 may be configured as or otherwise support a means for demodulating the second downlink signaling according to the first precoding parameter or according to a second precoding parameter indicated in the control signaling.

In some examples, to support communicating with the base station, the rank adaptation communication component 740 may be configured as or otherwise support a means for transmitting, based on the rank adaptation parameter, first uplink signaling in the first set of frequency resources according to the first rank and second uplink signaling in the second set of frequency resources according to the second rank.

In some examples, the signal encoding component 760 may be configured as or otherwise support a means for encoding the first uplink signaling according to a first precoding parameter, where the first uplink signaling is transmitted based on encoding the first uplink signaling. In some examples, the signal encoding component 760 may be configured as or otherwise support a means for encoding the second uplink signaling according to the first precoding parameter or according to a second precoding parameter indicated in the control signaling, where the second uplink signaling is transmitted based on encoding the second uplink signaling.

In some examples, the rank adaptation determination component 735 may be configured as or otherwise support a means for identifying, based on the control signaling, a quantity of frequency resources associated with the second rank. In some examples, the rank adaptation determination component 735 may be configured as or otherwise support a means for determining, based on identifying the quantity of frequency resources, the second set of frequency resources, where communicating with the base station is based on determining the second set of frequency resources.

In some examples, the rank adaptation parameter includes the quantity of frequency resources.

In some examples, the rank adaptation parameter indicates the quantity of frequency resources as a percentage of a frequency resource allocation for the communications with the base station.

In some examples, the threshold identification component 745 may be configured as or otherwise support a means for identifying, based on the control signaling, a threshold associated with a channel criterion of a channel for the communications with the base station. In some examples, the threshold component 750 may be configured as or otherwise support a means for determining, based on identifying the threshold, the second set of frequency resources, where communicating with the base station is based on determining the second set of frequency resources.

In some examples, the threshold component 750 may be configured as or otherwise support a means for comparing, with the threshold, a respective channel criterion of each frequency resource of a frequency resource allocation for the communications with the base station, where the second set of frequency resources includes one or more frequency resources of the frequency resource allocation that satisfy the threshold, and where determining the second set of frequency resources is based on the comparing.

In some examples, the channel criterion includes an energy parameter, a channel capacity, a channel covariance matrix condition number, a channel covariance matrix determinant, a channel covariance matrix eigenvalue summation, a minimum channel covariance matrix eigenvalue, or any combination thereof.

In some examples, the rank adaptation parameter includes the threshold.

In some examples, the capability report transmitter 755 may be configured as or otherwise support a means for transmitting, to the base station, an indication of a capability to support rank adaptation at the UE, where the control signaling is received based on transmitting the indication.

In some examples, the control signaling further indicates a rank adaptation procedure is applied for the communications with the base station.

In some examples, the first set of frequency resources include a first one or more subcarriers, a first one or more resource blocks, or a first one or more subbands. In some examples, the second set of frequency resources include a second one or more subcarriers, a second one or more resource blocks, or a second one or more subbands.

In some examples, the one or more reference signals include a sounding reference signal, a demodulation reference signal, a channel state information reference signal, or any combination thereof.

In some examples, the control signaling is received in a radio resource control message, a medium access control control element, a downlink control information message, or any combination thereof.

Figure 8:
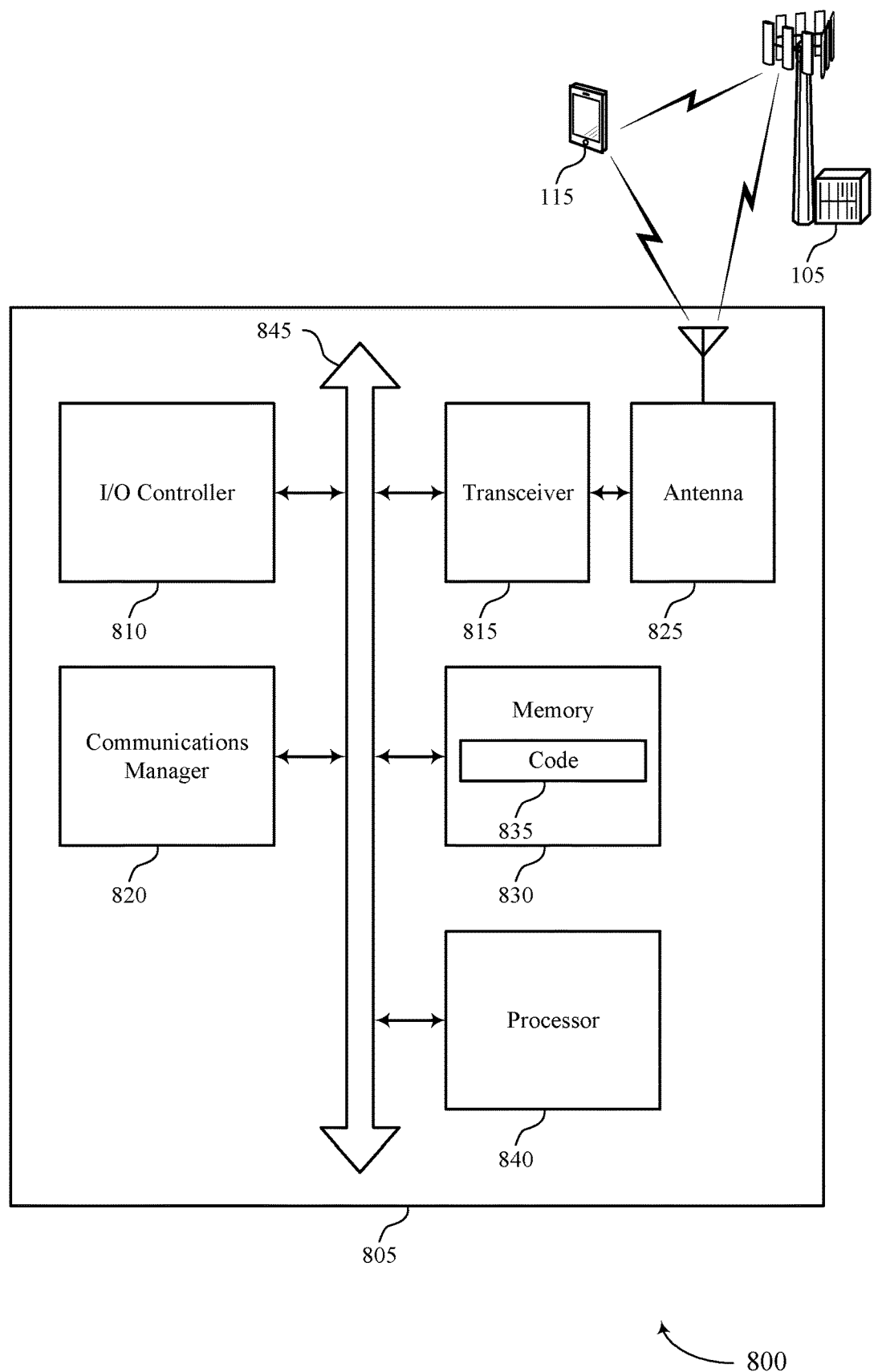
FIG. 8 shows a diagram of a system including a device that supports techniques for channel aware rank adaptation in accordance with aspects of the present disclosure.

FIG. 8 shows a diagram of a system 800 including a device 805 that supports techniques for channel aware rank adaptation in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting techniques for channel aware rank adaptation). For example, the device 805 or a component of the device 805 may include a processor 840 and memory 830 coupled to the processor 840, the processor 840 and memory 830 configured to perform various functions described herein.

The communications manager 820 may support wireless communications at a UE in accordance with examples as disclosed herein. For example, the communications manager 820 may be configured as or otherwise support a means for transmitting, to a base station, one or more reference signals. The communications manager 820 may be configured as or otherwise support a means for receiving control signaling indicating a rank adaptation parameter for communications with the base station, where the rank adaptation parameter is based on the one or more reference signals. The communications manager 820 may be configured as or otherwise support a means for determining, based on receiving the rank adaptation parameter, a first rank for communicating with the base station in a first set of frequency resources and a second rank for communicating with the base station in a second set of frequency resources, the second rank being lower than the first rank. The communications manager 820 may be configured as or otherwise support a means for communicating with the base station in the first set of frequency resources according to the first rank and in the second set of frequency resources according to the second rank.

By including or configuring the communications manager 820 in accordance with examples as described herein, the device 805 may support techniques for leveraging the increased resolution of channel rank assignment to improve throughput by transmitting data according to the dynamic rank assignment, which may improve overall network efficiency, reduce signaling overhead, and decrease consumption of power resources at the device 1205.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of techniques for channel aware rank adaptation as described herein, or the processor 840 and the memory 830 may be otherwise configured to perform or support such operations.

Figure 9:
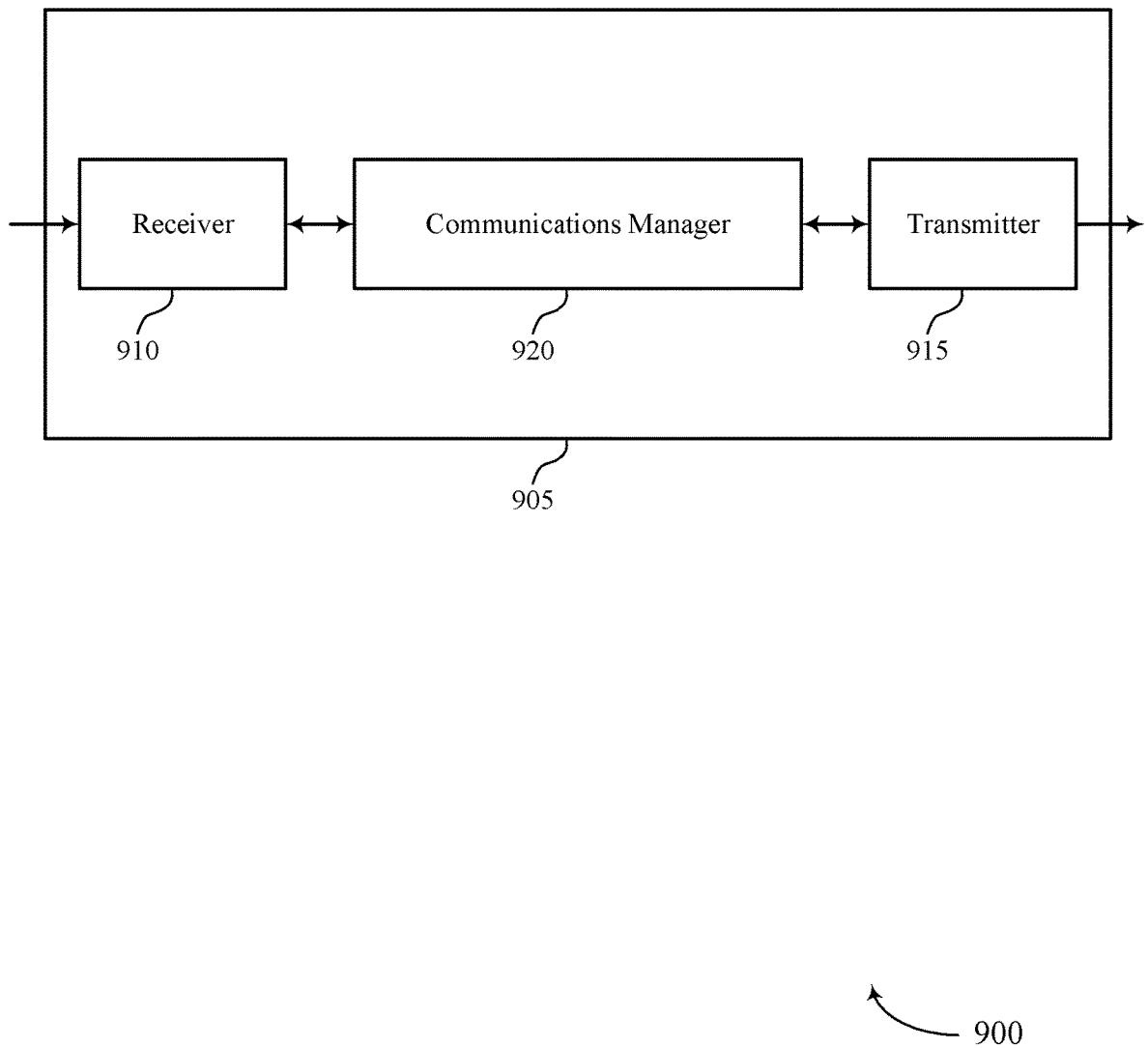
FIGS. 9 and 10 show block diagrams of devices that support techniques for channel aware rank adaptation in accordance with aspects of the present disclosure.

FIG. 9 shows a block diagram 900 of a device 905 that supports techniques for channel aware rank adaptation in accordance with aspects of the present disclosure. The device 905 may be an example of aspects of a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to techniques for channel aware rank adaptation). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to techniques for channel aware rank adaptation). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of techniques for channel aware rank adaptation as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communications at a base station in accordance with examples as disclosed herein. For example, the communications manager 920 may be configured as or otherwise support a means for receiving, from a UE, one or more reference signals. The communications manager 920 may be configured as or otherwise support a means for determining, based on a channel estimation procedure associated with the one or more reference signals received from the UE, a first rank for communicating with the UE in a first set of frequency resources and a second rank for communicating with the UE in a second set of frequency resources, the second rank being lower than the first rank. The communications manager 920 may be configured as or otherwise support a means for transmitting, to the UE, control signaling indicating a rank adaptation parameter for communications with the base station, the rank adaptation parameter based on determining the first rank and the second rank. The communications manager 920 may be configured as or otherwise support a means for communicating with the UE in the first set of frequency resources according to the first rank and in the second set of frequency resources according to the second rank, the communicating based on the rank adaptation parameter.

By including or configuring the communications manager 920 in accordance with examples as described herein, the device 905 (e.g., a processor controlling or otherwise coupled to the receiver 910, the transmitter 915, the communications manager 920, or a combination thereof) may support techniques for leveraging a common algorithm and joint criteria to enable adaptive rank assignment for frequency resources without additional signaling overhead.

Figure 10:
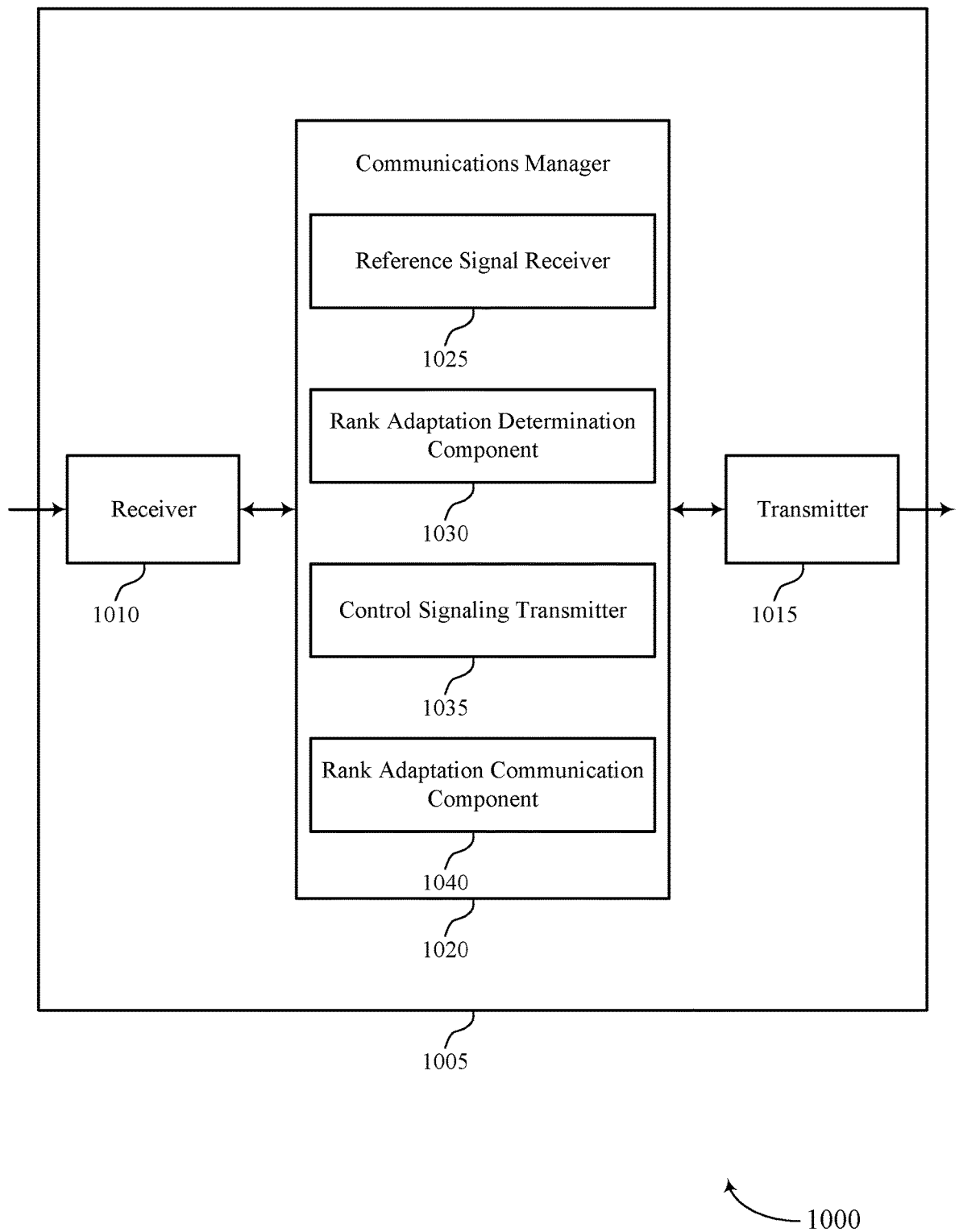

FIG. 10 shows a block diagram 1000 of a device 1005 that supports techniques for channel aware rank adaptation in accordance with aspects of the present disclosure. The device 1005 may be an example of aspects of a device 905 or a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to techniques for channel aware rank adaptation). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to techniques for channel aware rank adaptation). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of techniques for channel aware rank adaptation as described herein. For example, the communications manager 1020 may include a reference signal receiver 1025, a rank adaptation determination component 1030, a control signaling transmitter 1035, a rank adaptation communication component 1040, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communications at a base station in accordance with examples as disclosed herein. The reference signal receiver 1025 may be configured as or otherwise support a means for receiving, from a UE, one or more reference signals. The rank adaptation determination component 1030 may be configured as or otherwise support a means for determining, based on a channel estimation procedure associated with the one or more reference signals received from the UE, a first rank for communicating with the UE in a first set of frequency resources and a second rank for communicating with the UE in a second set of frequency resources, the second rank being lower than the first rank. The control signaling transmitter 1035 may be configured as or otherwise support a means for transmitting, to the UE, control signaling indicating a rank adaptation parameter for communications with the base station, the rank adaptation parameter based on determining the first rank and the second rank. The rank adaptation communication component 1040 may be configured as or otherwise support a means for communicating with the UE in the first set of frequency resources according to the first rank and in the second set of frequency resources according to the second rank, the communicating based on the rank adaptation parameter.

Figure 11:
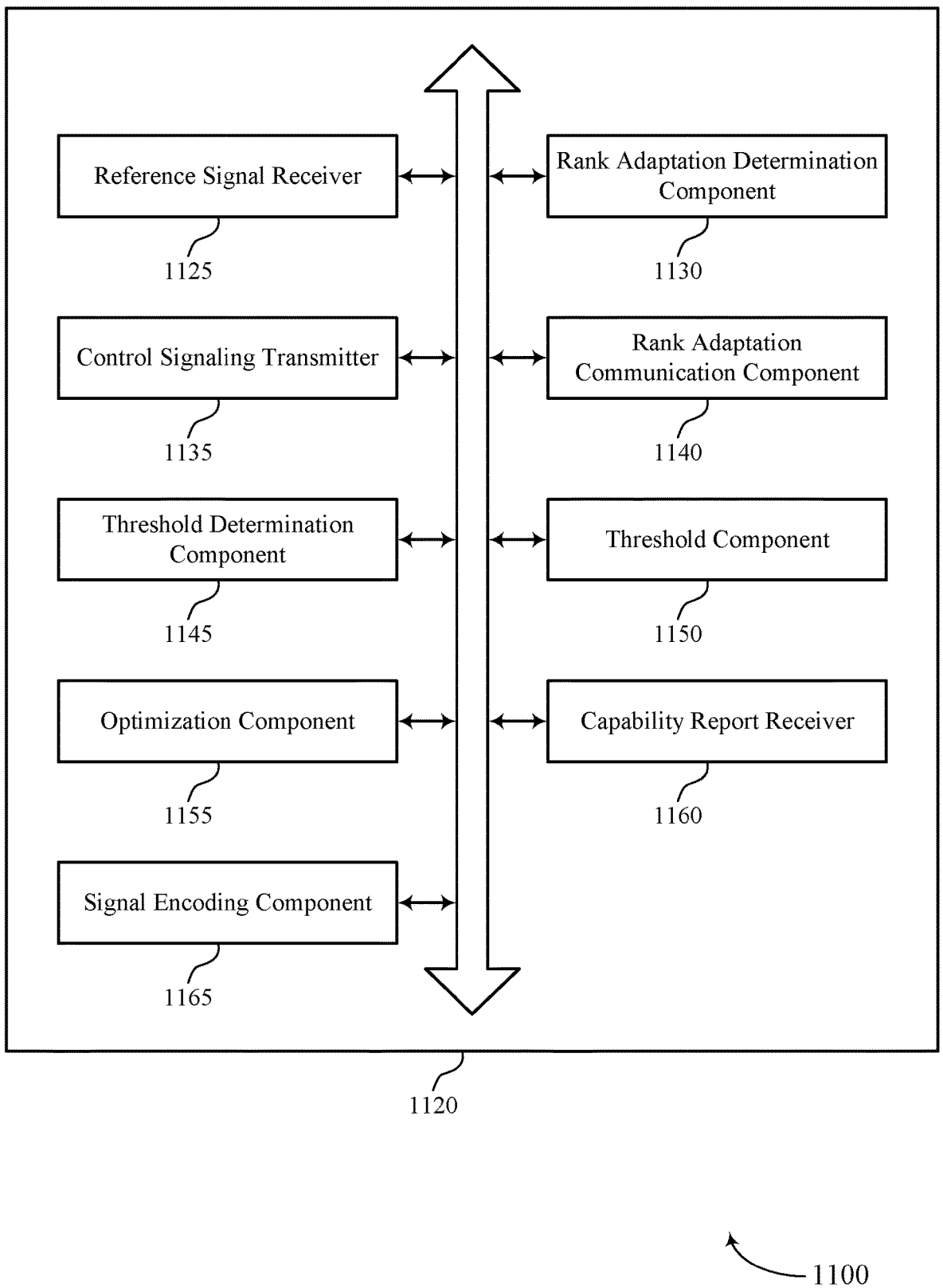
FIG. 11 shows a block diagram of a communications manager that supports techniques for channel aware rank adaptation in accordance with aspects of the present disclosure.

FIG. 11 shows a block diagram 1100 of a communications manager 1120 that supports techniques for channel aware rank adaptation in accordance with aspects of the present disclosure. The communications manager 1120 may be an example of aspects of a communications manager 920, a communications manager 1020, or both, as described herein. The communications manager 1120, or various components thereof, may be an example of means for performing various aspects of techniques for channel aware rank adaptation as described herein. For example, the communications manager 1120 may include a reference signal receiver 1125, a rank adaptation determination component 1130, a control signaling transmitter 1135, a rank adaptation communication component 1140, a threshold determination component 1145, a threshold component 1150, an optimization component 1155, a capability report receiver 1160, a signal encoding component 1165, or any combination thereof. Each of these components may communicate, directly or indirectly, with one another (e.g., via one or more buses).

The communications manager 1120 may support wireless communications at a base station in accordance with examples as disclosed herein. The reference signal receiver 1125 may be configured as or otherwise support a means for receiving, from a UE, one or more reference signals. The rank adaptation determination component 1130 may be configured as or otherwise support a means for determining, based on a channel estimation procedure associated with the one or more reference signals received from the UE, a first rank for communicating with the UE in a first set of frequency resources and a second rank for communicating with the UE in a second set of frequency resources, the second rank being lower than the first rank. The control signaling transmitter 1135 may be configured as or otherwise support a means for transmitting, to the UE, control signaling indicating a rank adaptation parameter for communications with the base station, the rank adaptation parameter based on determining the first rank and the second rank. The rank adaptation communication component 1140 may be configured as or otherwise support a means for communicating with the UE in the first set of frequency resources according to the first rank and in the second set of frequency resources according to the second rank, the communicating based on the rank adaptation parameter.

In some examples, to support communicating with the UE, the rank adaptation communication component 1140 may be configured as or otherwise support a means for transmitting, based on the rank adaptation parameter, first downlink signaling in the first set of frequency resources according to the first rank and second downlink signaling in the second set of frequency resources according to the second rank.

In some examples, the signal encoding component 1165 may be configured as or otherwise support a means for encoding the first downlink signaling according to a first precoding parameter, where the first uplink signaling is transmitted based on encoding the first uplink signaling. In some examples, the signal encoding component 1165 may be configured as or otherwise support a means for encoding the second downlink signaling according to the first precoding parameter or according to a second precoding parameter indicated in the control signaling, where the second uplink signaling is transmitted based on encoding the second uplink signaling.

In some examples, to support communicating with the UE, the rank adaptation communication component 1140 may be configured as or otherwise support a means for receiving, based on the rank adaptation parameter, first uplink signaling in the first set of frequency resources according to the first rank and second uplink signaling in the second set of frequency resources according to the second rank.

In some examples, the rank adaptation communication component 1140 may be configured as or otherwise support a means for demodulating the first uplink signaling according to a first precoding parameter. In some examples, the rank adaptation communication component 1140 may be configured as or otherwise support a means for demodulating the second uplink signaling according to the first precoding parameter or according to a second precoding parameter indicated in the control signaling.

In some examples, the rank adaptation determination component 1130 may be configured as or otherwise support a means for determining the second set of frequency resources based on the channel estimation procedure, where the second set of frequency resources includes a quantify of frequency resources, and where the control signaling is based on determining the second set of frequency resources.

In some examples, the rank adaptation parameter includes the quantity of frequency resources.

In some examples, the rank adaptation parameter indicates the quantity of frequency resources as a percentage of a frequency resource allocation for the communications with the base station.

In some examples, the threshold determination component 1145 may be configured as or otherwise support a means for determining, based on the channel estimation procedure, a threshold associated with a channel criterion of a channel for communications with the UE. In some examples, the threshold component 1150 may be configured as or otherwise support a means for determining, based on the threshold, the second set of frequency resources, where the control signaling is based on determining the second set of frequency resources.

In some examples, the threshold component 1150 may be configured as or otherwise support a means for comparing, with the threshold, a respective channel criterion of each frequency resource of a frequency resource allocation for the communications with the base station, where the second set of frequency resources includes one or more frequency resources of the frequency resource allocation that satisfy the threshold, and where determining the second set of frequency resources is based on the comparing.

In some examples, the threshold component 1150 may be configured as or otherwise support a means for adjusting the threshold associated with the channel criterion of the channel. In some examples, the threshold component 1150 may be configured as or otherwise support a means for determining whether frequency resources of a frequency resource allocation for the communications with the base station passes a cyclic redundancy check based on adjusting the threshold, where determining the second set of frequency resources is based on determining whether the frequency resources of the frequency resource allocation pass the cyclic redundancy check.

In some examples, the channel criterion includes an energy parameter, a channel capacity, a channel covariance matrix condition number, a channel covariance matrix determinant, a channel covariance matrix eigenvalue summation, a minimum channel covariance matrix eigenvalue, or any combination thereof.

In some examples, the rank adaptation parameter includes the threshold.

In some examples, the optimization component 1155 may be configured as or otherwise support a means for determining the second set of frequency resources based on an optimization procedure, where the control signaling is based on determining the second set of frequency resources.

In some examples, the optimization procedure includes a machine learning procedure, a constraint optimization procedure, an iterative hypothesis test procedure, a lookup table access procedure, or any combination thereof.

In some examples, the capability report receiver 1160 may be configured as or otherwise support a means for receiving, from the UE, an indication of a capability to support rank adaptation at the UE, where the control signaling is transmitted based on receiving the indication.

In some examples, the control signaling further indicates a rank adaptation procedure is applied for the communications with the base station.

In some examples, the first set of frequency resources include a first one or more subcarriers, a first one or more resource blocks, or a first one or more subbands. In some examples, the second set of frequency resources include a second one or more subcarriers, a second one or more resource blocks, or a second one or more subbands.

In some examples, the one or more reference signals include a sounding reference signal, a demodulation reference signal, a channel state information reference signal, or any combination thereof.

In some examples, the control signaling is received in a radio resource control message, a medium access control control element, a downlink control information message, or any combination thereof.

Figure 12:
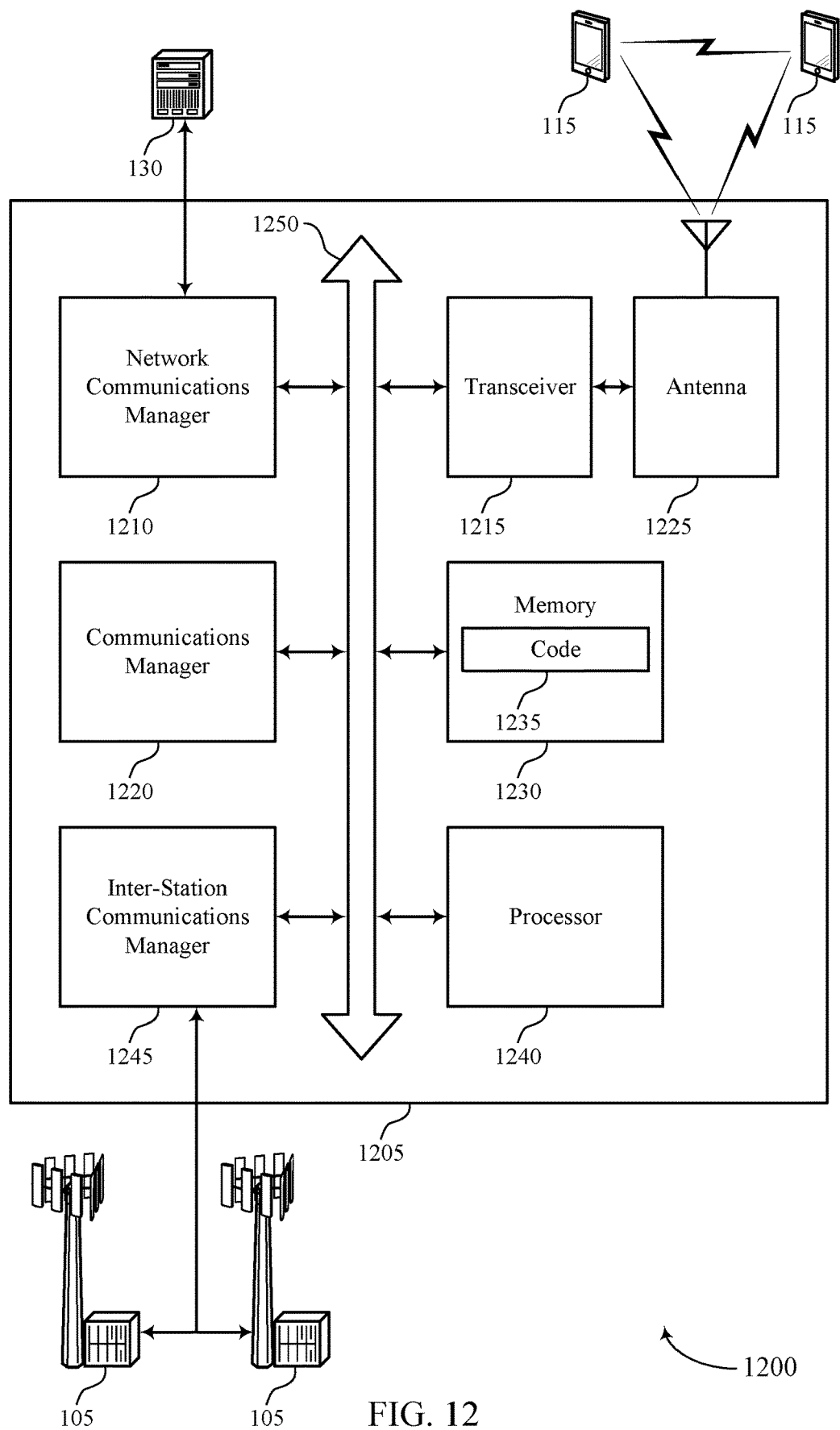
FIG. 12 shows a diagram of a system including a device that supports techniques for channel aware rank adaptation in accordance with aspects of the present disclosure.

FIG. 12 shows a diagram of a system 1200 including a device 1205 that supports techniques for channel aware rank adaptation in accordance with aspects of the present disclosure. The device 1205 may be an example of or include the components of a device 905, a device 1005, or a base station 105 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, a network communications manager 1210, a transceiver 1215, an antenna 1225, a memory 1230, code 1235, a processor 1240, and an inter-station communications manager 1245. These components may be in electronic communication or otherwise coupled (e.g., operatively, communicatively, functionally, electronically, electrically) via one or more buses (e.g., a bus 1250).

The network communications manager 1210 may manage communications with a core network 130 (e.g., via one or more wired backhaul links). For example, the network communications manager 1210 may manage the transfer of data communications for client devices, such as one or more UEs 115.

In some cases, the device 1205 may include a single antenna 1225. However, in some other cases the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include RAM and ROM. The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting techniques for channel aware rank adaptation). For example, the device 1205 or a component of the device 1205 may include a processor 1240 and memory 1230 coupled to the processor 1240, the processor 1240 and memory 1230 configured to perform various functions described herein.

The inter-station communications manager 1245 may manage communications with other base stations 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communications network technology to provide communication between base stations 105.

The communications manager 1220 may support wireless communications at a base station in accordance with examples as disclosed herein. For example, the communications manager 1220 may be configured as or otherwise support a means for receiving, from a UE, one or more reference signals. The communications manager 1220 may be configured as or otherwise support a means for determining, based on a channel estimation procedure associated with the one or more reference signals received from the UE, a first rank for communicating with the UE in a first set of frequency resources and a second rank for communicating with the UE in a second set of frequency resources, the second rank being lower than the first rank. The communications manager 1220 may be configured as or otherwise support a means for transmitting, to the UE, control signaling indicating a rank adaptation parameter for communications with the base station, the rank adaptation parameter based on determining the first rank and the second rank. The communications manager 1220 may be configured as or otherwise support a means for communicating with the UE in the first set of frequency resources according to the first rank and in the second set of frequency resources according to the second rank, the communicating based on the rank adaptation parameter.

By including or configuring the communications manager 1220 in accordance with examples as described herein, the device 1205 may support techniques for leveraging the increased resolution of channel rank assignment to improve throughput by transmitting according to the dynamic rank assignment, which may improve overall network efficiency, reduce signaling overhead, and decrease consumption of power resources at the device 1205.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of techniques for channel aware rank adaptation as described herein, or the processor 1240 and the memory 1230 may be otherwise configured to perform or support such operations.

Figure 13:
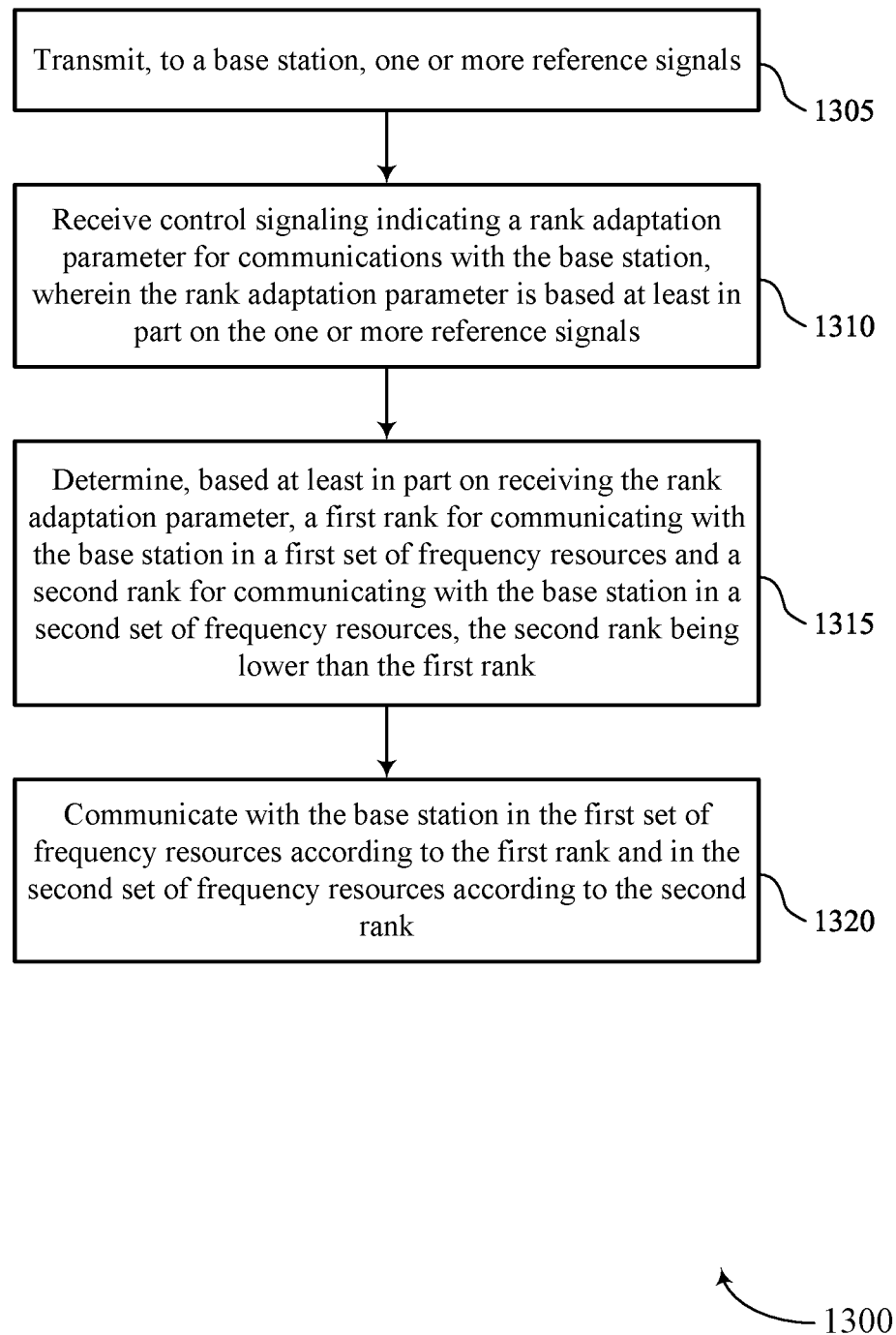
FIGS. 13 through 15 show flowcharts illustrating methods that support techniques for channel aware rank adaptation in accordance with aspects of the present disclosure.

FIG. 13 shows a flowchart illustrating a method 1300 that supports techniques for channel aware rank adaptation in accordance with aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1305, the method may include transmitting, to a base station, one or more reference signals. The operations of 1305 may be performed in accordance with examples as disclosed herein. In some examples, aspects of the operations of 1305 may be performed by a reference signal transmitter 725 as described with reference to FIG. 7.

At 1310, the method may include receiving control signaling indicating a rank adaptation parameter for communications with the base station, where the rank adaptation parameter is based on the one or more reference signals. The operations of 1310 may be performed in accordance with examples as disclosed herein. In some examples, aspects of the operations of 1310 may be performed by a control signaling receiver 730 as described with reference to FIG. 7.

At 1315, the method may include determining, based on receiving the rank adaptation parameter, a first rank for communicating with the base station in a first set of frequency resources and a second rank for communicating with the base station in a second set of frequency resources, the second rank being lower than the first rank. The operations of 1315 may be performed in accordance with examples as disclosed herein. In some examples, aspects of the operations of 1315 may be performed by a rank adaptation determination component 735 as described with reference to FIG. 7.

At 1320, the method may include communicating with the base station in the first set of frequency resources according to the first rank and in the second set of frequency resources according to the second rank. The operations of 1320 may be performed in accordance with examples as disclosed herein. In some examples, aspects of the operations of 1320 may be performed by a rank adaptation communication component 740 as described with reference to FIG. 7.

Figure 14:
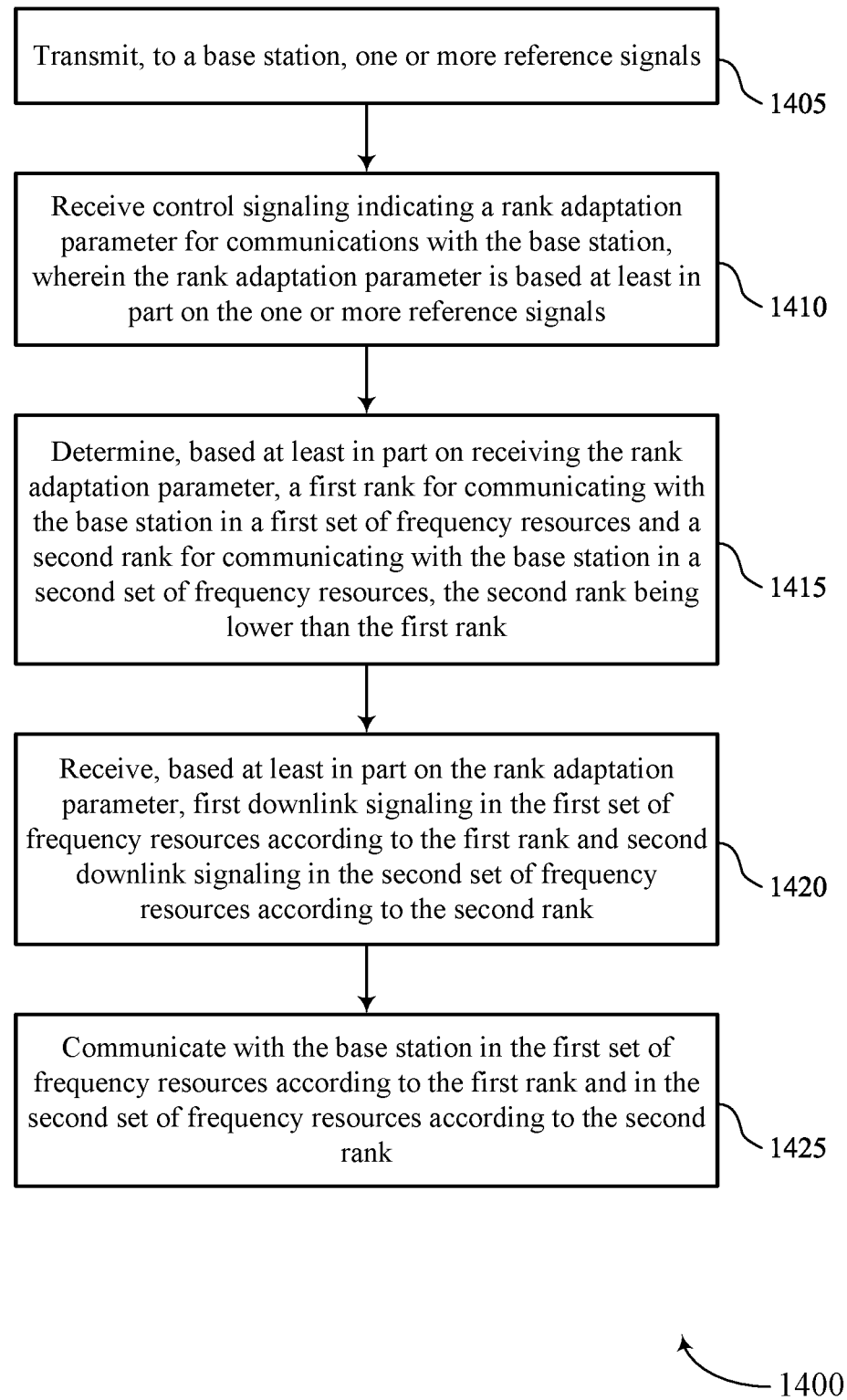

FIG. 14 shows a flowchart illustrating a method 1400 that supports techniques for channel aware rank adaptation in accordance with aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1405, the method may include transmitting, to a base station, one or more reference signals. The operations of 1405 may be performed in accordance with examples as disclosed herein. In some examples, aspects of the operations of 1405 may be performed by a reference signal transmitter 725 as described with reference to FIG. 7.

At 1410, the method may include receiving control signaling indicating a rank adaptation parameter for communications with the base station, where the rank adaptation parameter is based on the one or more reference signals. The operations of 1410 may be performed in accordance with examples as disclosed herein. In some examples, aspects of the operations of 1410 may be performed by a control signaling receiver 730 as described with reference to FIG. 7.

At 1415, the method may include determining, based on receiving the rank adaptation parameter, a first rank for communicating with the base station in a first set of frequency resources and a second rank for communicating with the base station in a second set of frequency resources, the second rank being lower than the first rank. The operations of 1415 may be performed in accordance with examples as disclosed herein. In some examples, aspects of the operations of 1415 may be performed by a rank adaptation determination component 735 as described with reference to FIG. 7.

At 1420, the method may include receiving, based on the rank adaptation parameter, first downlink signaling in the first set of frequency resources according to the first rank and second downlink signaling in the second set of frequency resources according to the second rank. The operations of 1420 may be performed in accordance with examples as disclosed herein. In some examples, aspects of the operations of 1420 may be performed by a rank adaptation communication component 740 as described with reference to FIG. 7.

At 1425, the method may include communicating with the base station in the first set of frequency resources according to the first rank and in the second set of frequency resources according to the second rank. The operations of 1425 may be performed in accordance with examples as disclosed herein. In some examples, aspects of the operations of 1425 may be performed by a rank adaptation communication component 740 as described with reference to FIG. 7.

Figure 15:
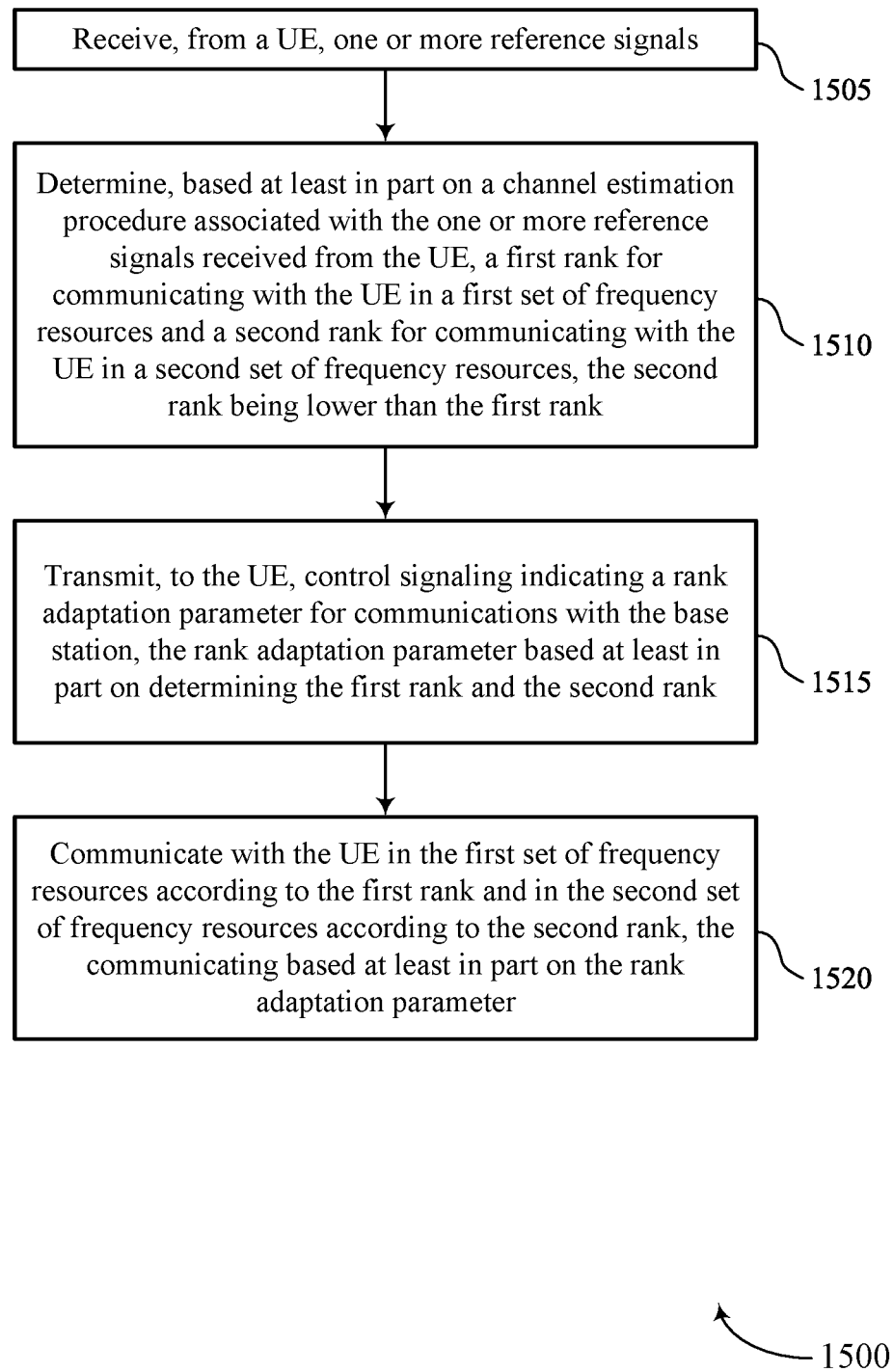

FIG. 15 shows a flowchart illustrating a method 1500 that supports techniques for channel aware rank adaptation in accordance with aspects of the present disclosure. The operations of the method 1500 may be implemented by a base station or its components as described herein. For example, the operations of the method 1500 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1505, the method may include receiving, from a UE, one or more reference signals. The operations of 1505 may be performed in accordance with examples as disclosed herein. In some examples, aspects of the operations of 1505 may be performed by a reference signal receiver 1125 as described with reference to FIG. 11.

At 1510, the method may include determining, based on a channel estimation procedure associated with the one or more reference signals received from the UE, a first rank for communicating with the UE in a first set of frequency resources and a second rank for communicating with the UE in a second set of frequency resources, the second rank being lower than the first rank. The operations of 1510 may be performed in accordance with examples as disclosed herein. In some examples, aspects of the operations of 1510 may be performed by a rank adaptation determination component 1130 as described with reference to FIG. 11.

At 1515, the method may include transmitting, to the UE, control signaling indicating a rank adaptation parameter for communications with the base station, the rank adaptation parameter based on determining the first rank and the second rank. The operations of 1515 may be performed in accordance with examples as disclosed herein. In some examples, aspects of the operations of 1515 may be performed by a control signaling transmitter 1135 as described with reference to FIG. 11.

At 1520, the method may include communicating with the UE in the first set of frequency resources according to the first rank and in the second set of frequency resources according to the second rank, the communicating based on the rank adaptation parameter. The operations of 1520 may be performed in accordance with examples as disclosed herein. In some examples, aspects of the operations of 1520 may be performed by a rank adaptation communication component 1140 as described with reference to FIG. 11.

The following provides an overview of aspects of the present disclosure:

Aspect 1: A method for wireless communications at a UE, comprising: transmitting, to a base station, one or more reference signals; receiving control signaling indicating a rank adaptation parameter for communications with the base station, wherein the rank adaptation parameter is based at least in part on the one or more reference signals; determining, based at least in part on receiving the rank adaptation parameter, a first rank for communicating with the base station in a first set of frequency resources and a second rank for communicating with the base station in a second set of frequency resources, the second rank being lower than the first rank; and communicating with the base station in the first set of frequency resources according to the first rank and in the second set of frequency resources according to the second rank.

Aspect 2: The method of aspect 1, wherein communicating with the base station comprises: receiving, based at least in part on the rank adaptation parameter, first downlink signaling in the first set of frequency resources according to the first rank and second downlink signaling in the second set of frequency resources according to the second rank.

Aspect 3: The method of aspect 2, further comprising: demodulating the first downlink signaling according to a first precoding parameter; and demodulating the second downlink signaling according to the first precoding parameter or according to a second precoding parameter indicated in the control signaling.

Aspect 4: The method of any of aspects 1 through 3, wherein communicating with the base station comprises: transmitting, based at least in part on the rank adaptation parameter, first uplink signaling in the first set of frequency resources according to the first rank and second uplink signaling in the second set of frequency resources according to the second rank.

Aspect 5: The method of aspect 4, further comprising: encoding the first uplink signaling according to a first precoding parameter, wherein the first uplink signaling is transmitted based at least in part on encoding the first uplink signaling; and encoding the second uplink signaling according to the first precoding parameter or according to a second precoding parameter indicated in the control signaling, wherein the second uplink signaling is transmitted based at least in part on encoding the second uplink signaling.

Aspect 6: The method of any of aspects 1 through 5, further comprising: identifying, based at least in part on the control signaling, a quantity of frequency resources associated with the second rank; and determining, based at least in part on identifying the quantity of frequency resources, the second set of frequency resources, wherein communicating with the base station is based at least in part on determining the second set of frequency resources.

Aspect 7: The method of aspect 6, wherein the rank adaptation parameter comprises the quantity of frequency resources.

Aspect 8: The method of any of aspects 6 through 7, wherein the rank adaptation parameter indicates the quantity of frequency resources as a percentage of a frequency resource allocation for the communications with the base station.

Aspect 9: The method of any of aspects 1 through 8, further comprising: identifying, based at least in part on the control signaling, a threshold associated with a channel criterion of a channel for the communications with the base station; and determining, based at least in part on identifying the threshold, the second set of frequency resources, wherein communicating with the base station is based at least in part on determining the second set of frequency resources.

Aspect 10: The method of aspect 9, further comprising: comparing, with the threshold, a respective channel criterion of each frequency resource of a frequency resource allocation for the communications with the base station, wherein the second set of frequency resources comprises one or more frequency resources of the frequency resource allocation that satisfy the threshold, and wherein determining the second set of frequency resources is based at least in part on the comparing.

Aspect 11: The method of any of aspects 9 through 10, wherein the channel criterion comprises an energy parameter, a channel capacity, a channel covariance matrix condition number, a channel covariance matrix determinant, a channel covariance matrix eigenvalue summation, a minimum channel covariance matrix eigenvalue, or any combination thereof.

Aspect 12: The method of any of aspects 9 through 11, wherein the rank adaptation parameter comprises the threshold.

Aspect 13: The method of any of aspects 1 through 12, further comprising: transmitting, to the base station, an indication of a capability to support rank adaptation at the UE, wherein the control signaling is received based at least in part on transmitting the indication.

Aspect 14: The method of any of aspects 1 through 13, wherein the control signaling further indicates a rank adaptation procedure is applied for the communications with the base station.

Aspect 15: The method of any of aspects 1 through 14, wherein the first set of frequency resources comprise a first one or more subcarriers, a first one or more resource blocks, or a first one or more subbands; and the second set of frequency resources comprise a second one or more subcarriers, a second one or more resource blocks, or a second one or more subbands.

Aspect 16: The method of any of aspects 1 through 15, wherein the one or more reference signals comprise a sounding reference signal, a demodulation reference signal, a channel state information reference signal, or any combination thereof.

Aspect 17: The method of any of aspects 1 through 16, wherein the control signaling is received in a radio resource control message, a medium access control control element, a downlink control information message, or any combination thereof.

Aspect 18: A method for wireless communications at a base station, comprising: receiving, from a UE, one or more reference signals; determining, based at least in part on a channel estimation procedure associated with the one or more reference signals received from the UE, a first rank for communicating with the UE in a first set of frequency resources and a second rank for communicating with the UE in a second set of frequency resources, the second rank being lower than the first rank; transmitting, to the UE, control signaling indicating a rank adaptation parameter for communications with the base station, the rank adaptation parameter based at least in part on determining the first rank and the second rank; and communicating with the UE in the first set of frequency resources according to the first rank and in the second set of frequency resources according to the second rank, the communicating based at least in part on the rank adaptation parameter.

Aspect 19: The method of aspect 18, wherein communicating with the UE comprises: transmitting, based at least in part on the rank adaptation parameter, first downlink signaling in the first set of frequency resources according to the first rank and second downlink signaling in the second set of frequency resources according to the second rank.

Aspect 20: The method of aspect 19, further comprising: encoding the first downlink signaling according to a first precoding parameter, wherein the first uplink signaling is transmitted based at least in part on encoding the first uplink signaling; and encoding the second downlink signaling according to the first precoding parameter or according to a second precoding parameter indicated in the control signaling, wherein the second uplink signaling is transmitted based at least in part on encoding the second uplink signaling.

Aspect 21: The method of any of aspects 18 through 20, wherein communicating with the UE comprises: receiving, based at least in part on the rank adaptation parameter, first uplink signaling in the first set of frequency resources according to the first rank and second uplink signaling in the second set of frequency resources according to the second rank.

Aspect 22: The method of aspect 21, further comprising: demodulating the first uplink signaling according to a first precoding parameter; and demodulating the second uplink signaling according to the first precoding parameter or according to a second precoding parameter indicated in the control signaling.

Aspect 23: The method of any of aspects 18 through 22, further comprising: determining the second set of frequency resources based at least in part on the channel estimation procedure, wherein the second set of frequency resources comprises a quantify of frequency resources, and wherein the control signaling is based at least in part on determining the second set of frequency resources.

Aspect 24: The method of aspect 23, wherein the rank adaptation parameter comprises the quantity of frequency resources.

Aspect 25: The method of any of aspects 23 through 24, wherein the rank adaptation parameter indicates the quantity of frequency resources as a percentage of a frequency resource allocation for the communications with the base station.

Aspect 26: The method of any of aspects 18 through 25, further comprising: determining, based at least in part on the channel estimation procedure, a threshold associated with a channel criterion of a channel for communications with the UE; determining, based at least in part on the threshold, the second set of frequency resources, wherein the control signaling is based at least in part on determining the second set of frequency resources.

Aspect 27: The method of aspect 26, further comprising: comparing, with the threshold, a respective channel criterion of each frequency resource of a frequency resource allocation for the communications with the base station, wherein the second set of frequency resources comprises one or more frequency resources of the frequency resource allocation that satisfy the threshold, and wherein determining the second set of frequency resources is based at least in part on the comparing.

Aspect 28: The method of any of aspects 26 through 27, further comprising: adjusting the threshold associated with the channel criterion of the channel; determining whether frequency resources of a frequency resource allocation for the communications with the base station passes a cyclic redundancy check based at least in part on adjusting the threshold, wherein determining the second set of frequency resources is based at least in part on determining whether the frequency resources of the frequency resource allocation pass the cyclic redundancy check.

Aspect 29: The method of any of aspects 26 through 28, wherein the channel criterion comprises an energy parameter, a channel capacity, a channel covariance matrix condition number, a channel covariance matrix determinant, a channel covariance matrix eigenvalue summation, a minimum channel covariance matrix eigenvalue, or any combination thereof.

Aspect 30: The method of any of aspects 26 through 29, wherein the rank adaptation parameter comprises the threshold.

Aspect 31: The method of any of aspects 18 through 30, further comprising: determining the second set of frequency resources based at least in part on an optimization procedure, wherein the control signaling is based at least in part on determining the second set of frequency resources.

Aspect 32: The method of aspect 31, wherein the optimization procedure comprises a machine learning procedure, a constraint optimization procedure, an iterative hypothesis test procedure, a lookup table access procedure, or any combination thereof.

Aspect 33: The method of any of aspects 18 through 32, further comprising: receiving, from the UE, an indication of a capability to support rank adaptation at the UE, wherein the control signaling is transmitted based at least in part on receiving the indication.

Aspect 34: The method of any of aspects 18 through 33, wherein the control signaling further indicates a rank adaptation procedure is applied for the communications with the base station.

Aspect 35: The method of any of aspects 18 through 34, wherein the first set of frequency resources comprise a first one or more subcarriers, a first one or more resource blocks, or a first one or more subbands; and the second set of frequency resources comprise a second one or more subcarriers, a second one or more resource blocks, or a second one or more subbands.

Aspect 36: The method of any of aspects 18 through 35, wherein the one or more reference signals comprise a sounding reference signal, a demodulation reference signal, a channel state information reference signal, or any combination thereof.

Aspect 37: The method of any of aspects 18 through 36, wherein the control signaling is received in a radio resource control message, a medium access control control element, a downlink control information message, or any combination thereof.

Aspect 38: An apparatus for wireless communications at a UE, comprising a processor; memory coupled with the processor; and instructions stored in the memory and executable by the processor to cause the apparatus to perform a method of any of aspects 1 through 17.

Aspect 39: An apparatus for wireless communications at a UE, comprising at least one means for performing a method of any of aspects 1 through 17.

Aspect 40: A non-transitory computer-readable medium storing code for wireless communications at a UE, the code comprising instructions executable by a processor to perform a method of any of aspects 1 through 17.

Aspect 41: An apparatus for wireless communications at a base station, comprising a processor; memory coupled with the processor; and instructions stored in the memory and executable by the processor to cause the apparatus to perform a method of any of aspects 18 through 37.

Aspect 42: An apparatus for wireless communications at a base station, comprising at least one means for performing a method of any of aspects 18 through 37.

Aspect 43: A non-transitory computer-readable medium storing code for wireless communications at a base station, the code comprising instructions executable by a processor to perform a method of any of aspects 18 through 37.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
    transmitting, to a network device, one or more reference signals;
    receiving control signaling indicating a rank adaptation parameter for communications with the network device, wherein the rank adaptation parameter is based at least in part on the one or more reference signals, and wherein the rank adaptation parameter indicates a quantity of frequency resources or a threshold;
    determining, based at least in part on the quantity of frequency resources or the threshold indicated in the rank adaptation parameter, a first rank for communicating with the network device in a first set of frequency resources and a second rank for communicating with the network device in a second set of frequency resources, the second rank being lower than the first rank; and
    communicating with the network device in the first set of frequency resources according to the first rank and in the second set of frequency resources according to the second rank.

2. The method of claim 1, wherein communicating with the network device comprises:
    receiving, based at least in part on the rank adaptation parameter, first downlink signaling in the first set of frequency resources according to the first rank and second downlink signaling in the second set of frequency resources according to the second rank.

3. The method of claim 2, further comprising:
    demodulating the first downlink signaling according to a first precoding parameter; and
    demodulating the second downlink signaling according to the first precoding parameter or according to a second precoding parameter indicated in the control signaling.

4. The method of claim 1, wherein communicating with the network device comprises:
    transmitting, based at least in part on the rank adaptation parameter, first uplink signaling in the first set of frequency resources according to the first rank and second uplink signaling in the second set of frequency resources according to the second rank.

5. The method of claim 4, further comprising:
    encoding the first uplink signaling according to a first precoding parameter, wherein the first uplink signaling is transmitted based at least in part on encoding the first uplink signaling; and encoding the second uplink signaling according to the first precoding parameter or according to a second precoding parameter indicated in the control signaling, wherein the second uplink signaling is transmitted based at least in part on encoding the second uplink signaling.

6. The method of claim 1, further comprising:
identifying, based at least in part on the control signaling, a quantity of frequency resources associated with the second rank; and
determining, based at least in part on identifying the quantity of frequency resources, the second set of frequency resources, wherein communicating with the network device is based at least in part on determining the second set of frequency resources.

7. The method of claim 6, wherein the rank adaptation parameter indicates the quantity of frequency resources as a percentage of a frequency resource allocation for the communications with the network device.

8. The method of claim 1, further comprising:
identifying, based at least in part on the control signaling, the threshold associated with a channel criterion of a channel for the communications with the network device; and
determining, based at least in part on identifying the threshold, the second set of frequency resources, wherein communicating with the network device is based at least in part on determining the second set of frequency resources.

9. The method of claim 8, further comprising:
comparing, with the threshold, a respective channel criterion of each frequency resource of a frequency resource allocation for the communications with the network device, wherein the second set of frequency resources comprises one or more frequency resources of the frequency resource allocation that satisfy the threshold, and wherein determining the second set of frequency resources is based at least in part on the comparing.

10. The method of claim 8, wherein the channel criterion comprises an energy parameter, a channel capacity, a channel covariance matrix condition number, a channel covariance matrix determinant, a channel covariance matrix eigenvalue summation, a minimum channel covariance matrix eigenvalue, or any combination thereof.

11. The method of claim 1, further comprising:
transmitting, to the network device, an indication of a capability to support rank adaptation at the UE, wherein the control signaling is received based at least in part on transmitting the indication and wherein the control signaling further indicates a rank adaptation procedure is applied for the communications with the network device.

12. The method of claim 1, wherein:
the first set of frequency resources comprise a first one or more subcarriers, a first one or more resource blocks, or a first one or more subbands; and
the second set of frequency resources comprise a second one or more subcarriers, a second one or more resource blocks, or a second one or more subbands.

13. The method of claim 1, wherein the one or more reference signals comprise a sounding reference signal, a demodulation reference signal, a channel state information reference signal, or any combination thereof.

14. The method of claim 1, wherein the control signaling is received in a radio resource control message, a medium access control control element, a downlink control information message, or any combination thereof.

15. A method for wireless communications at a network device, comprising:
receiving, from a user equipment (UE), one or more reference signals;
determining, based at least in part on a channel estimation procedure associated with the one or more reference signals received from the UE, a first rank for communicating with the UE in a first set of frequency resources and a second rank for communicating with the UE in a second set of frequency resources, the second rank being lower than the first rank;
transmitting, to the UE, control signaling indicating a rank adaptation parameter for communications with the network device, the rank adaptation parameter based at least in part on determining the first rank and the second rank, and the rank adaptation parameter indicative of a quantity of frequency resources or a threshold; and
communicating with the UE in the first set of frequency resources according to the first rank and in the second set of frequency resources according to the second rank, the communicating based at least in part on the rank adaptation parameter.

16. The method of claim 15, wherein communicating with the UE comprises:
transmitting, based at least in part on the rank adaptation parameter, first downlink signaling in the first set of frequency resources according to the first rank and second downlink signaling in the second set of frequency resources according to the second rank.

17. The method of claim 16, further comprising:
encoding the first downlink signaling according to a first precoding parameter, wherein the first downlink signaling is transmitted based at least in part on encoding the first downlink signaling; and
encoding the second downlink signaling according to the first precoding parameter or according to a second precoding parameter indicated in the control signaling, wherein the second downlink signaling is transmitted based at least in part on encoding the second downlink signaling.

18. The method of claim 15, wherein communicating with the UE comprises:
receiving, based at least in part on the rank adaptation parameter, first uplink signaling in the first set of frequency resources according to the first rank and second uplink signaling in the second set of frequency resources according to the second rank.

19. The method of claim 18, further comprising:
demodulating the first uplink signaling according to a first precoding parameter; and
demodulating the second uplink signaling according to the first precoding parameter or according to a second precoding parameter indicated in the control signaling.

20. The method of claim 15, further comprising:
determining the second set of frequency resources based at least in part on the channel estimation procedure, wherein the second set of frequency resources comprises a quantify of frequency resources, and wherein the control signaling is based at least in part on determining the second set of frequency resources.

21. The method of claim 15, further comprising:
determining, based at least in part on the channel estimation procedure, the threshold associated with a channel criterion of a channel for communications with the UE; and determining, based at least in part on the threshold, the second set of frequency resources, wherein the control signaling is based at least in part on determining the second set of frequency resources.

22. The method of claim 21, further comprising:
comparing, with the threshold, a respective channel criterion of each frequency resource of a frequency resource allocation for the communications with the network device, wherein the second set of frequency resources comprises one or more frequency resources of the frequency resource allocation that satisfy the threshold, and wherein determining the second set of frequency resources is based at least in part on the comparing.

23. The method of claim 21, further comprising:
adjusting the threshold associated with the channel criterion of the channel; and
determining whether frequency resources of a frequency resource allocation for the communications with the network device passes a cyclic redundancy check based at least in part on adjusting the threshold, wherein determining the second set of frequency resources is based at least in part on determining whether the frequency resources of the frequency resource allocation pass the cyclic redundancy check.

24. The method of claim 21, wherein the channel criterion comprises an energy parameter, a channel capacity, a channel covariance matrix condition number, a channel covariance matrix determinant, a channel covariance matrix eigenvalue summation, a minimum channel covariance matrix eigenvalue, or any combination thereof.

25. The method of claim 15, further comprising:
determining the second set of frequency resources based at least in part on an optimization procedure, wherein the control signaling is based at least in part on determining the second set of frequency resources and wherein the optimization procedure comprises a machine learning procedure, a constraint optimization procedure, an iterative hypothesis test procedure, a lookup table access procedure, or any combination thereof.

26. The method of claim 15, further comprising:
receiving, from the UE, an indication of a capability to support rank adaptation at the UE, wherein the control signaling is transmitted based at least in part on receiving the indication and wherein the control signaling further indicates a rank adaptation procedure is applied for the communications with the network device.

27. The method of claim 15, wherein:
the first set of frequency resources comprise a first one or more subcarriers, a first one or more resource blocks, or a first one or more subbands; and
the second set of frequency resources comprise a second one or more subcarriers, a second one or more resource blocks, or a second one or more subbands.

28. The method of claim 15, wherein the one or more reference signals comprise a sounding reference signal, a demodulation reference signal, a channel state information reference signal, or any combination thereof and wherein the control signaling is received in a radio resource control message, a medium access control control element, a downlink control information message, or any combination thereof.

29. An apparatus for wireless communications at a user equipment (UE), comprising:
one or more memories storing processor-executable code; and
one or more processors coupled with the one or more memories and individually or collectively operable to execute the code to cause the UE to:
transmit, to a network device, one or more reference signals;
receive control signaling indicating a rank adaptation parameter for communications with the network device, wherein the rank adaptation parameter is based at least in part on the one or more reference signals, and wherein the rank adaptation parameter indicates a quantity of frequency resources or a threshold;
determine, based at least in part on the quantity of frequency resources or the threshold indicated in the rank adaptation parameter, a first rank for communicating with the network device in a first set of frequency resources and a second rank for communicating with the network device in a second set of frequency resources, the second rank being lower than the first rank; and
communicate with the network device in the first set of frequency resources according to the first rank and in the second set of frequency resources according to the second rank.

30. An apparatus for wireless communications at a network device, comprising:
one or more memories storing processor-executable code; and
one or more processors coupled with the one or more memories and individually or collectively operable to execute the code to cause the network device to:
receive, from a user equipment (UE), one or more reference signals;
determine, based at least in part on a channel estimation procedure associated with the one or more reference signals received from the UE, a first rank for communicating with the UE in a first set of frequency resources and a second rank for communicating with the UE in a second set of frequency resources, the second rank being lower than the first rank;
transmit, to the UE, control signaling indicating a rank adaptation parameter for communications with the network device, the rank adaptation parameter based at least in part on determining the first rank and the second rank, and the rank adaptation parameter indicative of a quantity of frequency resources or a threshold; and
communicate with the UE in the first set of frequency resources according to the first rank and in the second set of frequency resources according to the second rank, the communicating based at least in part on the rank adaptation parameter.

* * * * *